United States Patent
Da Silva et al.

(10) Patent No.: US 12,463,761 B2
(45) Date of Patent: Nov. 4, 2025

(54) APPARATUS, SYSTEM, AND METHOD OF A TRANSMIT SECTOR SWEEP (TXSS) PROCEDURE OVER A MILLIMETERWAVE (mmWave) WIRELESS COMMUNICATION CHANNEL

(71) Applicant: Intel Corporation, Santa Clara, CA (US)

(72) Inventors: Claudio Da Silva, Portland, OR (US); Cheng Chen, Camas, WA (US); Laurent Cariou, Milizac (FR); Po-Kai Huang, San Jose, CA (US); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 721 days.

(21) Appl. No.: 17/561,758

(22) Filed: Dec. 24, 2021

(65) Prior Publication Data

US 2022/0158790 A1 May 19, 2022

(51) Int. Cl.
*H04W 72/0446* (2023.01)
*H04B 7/06* (2006.01)
(Continued)

(52) U.S. Cl.
CPC ......... *H04L 5/0048* (2013.01); *H04B 7/0636* (2013.01); *H04B 17/24* (2015.01);
(Continued)

(58) Field of Classification Search
CPC .... H04B 7/0491; H04B 7/0636; H04B 17/24; H04B 17/252; H04L 27/2646;
(Continued)

(56) References Cited

U.S. PATENT DOCUMENTS

| 11,716,613 B2* | 8/2023 | Seok | H04W 12/037 |
| | | | 380/33 |
| 2011/0149842 A1* | 6/2011 | Cordeiro | H04L 1/1607 |
| | | | 370/328 |

(Continued)

FOREIGN PATENT DOCUMENTS

EP      3 787 198      3/2021

OTHER PUBLICATIONS

R1-1912936, "DL signals and channel for NR-U", Nov. 18-Nov. 22, 2019, pp. 1-16 (Year: 2019).*

(Continued)

*Primary Examiner* — Salvador E Rivas
(74) *Attorney, Agent, or Firm* — Shichrur & Co.

(57) ABSTRACT

For example, an Access Point (AP) device may be configured to transmit a trigger frame from a sub 10 Gigahertz (GHz) (sub-10 GHz) AP of the AP device over a sub-10 GHz wireless communication channel, the trigger frame configured to trigger a Transmit Sector Sweep (TXSS) procedure over a millimeterWave (mmWave) wireless communication channel; based on the trigger frame, transmit a sequence of sector sweep packets of the TXSS procedure from a mmWave AP of the AP device over the mmWave wireless communication channel; and process a feedback frame from a non-AP device to identify feedback information based on the sequence of sector sweep packets, the feedback frame received at the sub-10 GHz AP over the sub-10 GHz wireless communication channel after the TXSS procedure.

24 Claims, 11 Drawing Sheets

(51) Int. Cl.
  *H04B 17/20* (2015.01)
  *H04B 17/24* (2015.01)
  *H04L 5/00* (2006.01)
  *H04L 27/20* (2006.01)
  *H04L 27/26* (2006.01)
  *H04W 36/00* (2009.01)
  *H04W 52/24* (2009.01)
  *H04W 74/00* (2009.01)
  *H04W 88/08* (2009.01)

(52) U.S. Cl.
  CPC ......... *H04B 17/252* (2023.05); *H04L 5/0007* (2013.01); *H04L 27/2064* (2013.01); *H04L 27/2646* (2013.01); *H04W 36/0069* (2018.08); *H04W 52/244* (2013.01); *H04W 72/0446* (2013.01); *H04W 74/006* (2013.01); *H04W 88/08* (2013.01)

(58) Field of Classification Search
  CPC ........... H04L 27/2039; H04L 27/2064; H04W 52/244; H04W 88/08; H04W 36/0069
  See application file for complete search history.

(56) References Cited

U.S. PATENT DOCUMENTS

| | | | | |
|---|---|---|---|---|
| 2012/0009880 | A1* | 1/2012 | Trainin | H04B 7/0617 |
| | | | | 455/67.11 |
| 2016/0014034 | A1* | 1/2016 | Bhushan | H04W 74/0816 |
| | | | | 370/253 |
| 2016/0285583 | A1* | 9/2016 | Kasher | H04B 7/0695 |
| 2017/0352954 | A1* | 12/2017 | Abdallah | H01Q 3/34 |
| 2021/0067227 | A1* | 3/2021 | Da Silva | H04B 7/086 |
| 2021/0143887 | A1 | 5/2021 | Oteri et al. | |
| 2021/0306057 | A1 | 9/2021 | Lou et al. | |
| 2021/0377928 | A1 | 12/2021 | Seok et al. | |

OTHER PUBLICATIONS

P. Zhou et al., "IEEE 802.11ay-Based mmWave WLANs: Design Challenges and Solutions," in IEEE Communications Surveys & Tutorials, vol. 20, No. 3, pp. 1654-1681, thirdquarter 2018, doi: 10.1109/COMST.2018.2816920. (Year: 2018).*

International Search Report and the Written Opinion for International Application No. PCT/US2022/050991, mailed on Apr. 13, 2023, 11 pages.

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™—2020 (Revision of IEEE Std 802.11-2016), Approved Dec. 3, 2020, 4379 pages.

IEEE Standard for Information Technology—Telecommunications and Information Exchange between Systems Local and Metropolitan Area Networks—Specific Requirements Part 11: Wireless LAN Medium Access Control (MAC) and Physical Layer (PHY) Specifications Amendment 2: Enhanced Throughput for Operations in License-exempt Bands above 45 Ghz, IEEE Computer Society, IEEE Std 802.11ay™—2021 (Amendment to IEEE Std 802.11™—2020 as amended by IEEE Std 802.11ax™—2021), 768 pages.

Claudio R. C. M. da Silva et al., "Beamforming Training for IEEE 802.11ay Millimeter Wave Systems", Next Generation and Standards (NGS) and Wireless Connectivity Solutions (WCS), Intel Corporation, 2018, 6 pages.

International Preliminary Report on Patentability for International Application No. PCT/US2022/050991, mailed on Jul. 4, 2024, 7 pages.

* cited by examiner

APPARATUS, SYSTEM, AND METHOD OF A TRANSMIT SECTOR SWEEP (TXSS) PROCEDURE OVER A MILLIMETERWAVE (mmWave) WIRELESS COMMUNICATION CHANNEL

TECHNICAL FIELD

Aspects described herein generally relate to a Transmit Sector Sweep (TXSS) procedure over a millimeterWave (mmWave) wireless communication channel.

BACKGROUND

Devices in a wireless communication system may be configured to communicate a millimeterWave (mmWave) wireless communication channel. There is a need to provide a technical solution to support discovery and/or beamforming training over the mmWave wireless communication channel.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
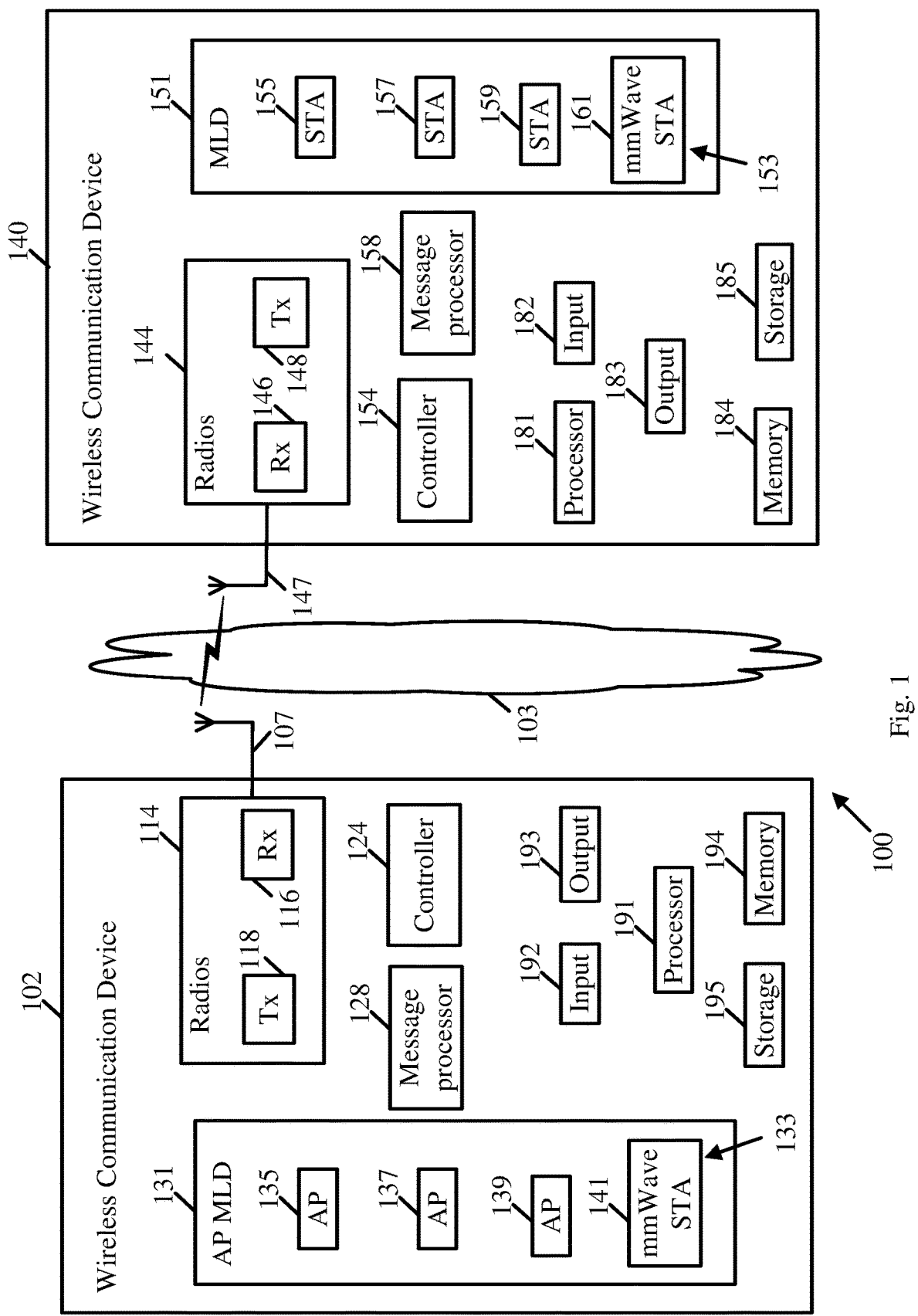
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (IEEE 802.11-2020, IEEE *Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications*, December, 2020); and/or IEEE 802.11be (IEEE *P802.11be/ D1.2 Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)*, September 2021)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MIS 0) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

Some demonstrative aspects may be implemented by a mmWave STA (mSTA), which may include for example, a STA having a radio transmitter, which is capable of operating on a channel that is within the mmWave frequency band. In one example, mmWave communications may involve one or more directional links to communicate at a rate of multiple gigabits per second, for example, at least 1 Gigabit per second, e.g., at least 7 Gigabit per second, at least 30 Gigabit per second, or any other rate.

In some demonstrative aspects, the mmWave STA may include a Directional Multi-Gigabit (DMG) STA, which may be configured to communicate over a DMG frequency band. For example, the DMG band may include a frequency band wherein the channel starting frequency is above 45 GHz.

In some demonstrative aspects, the mmWave STA may include an Enhanced DMG (EDMG) STA, which may be configured to implement one or more mechanisms, which may be configured to enable Single User (SU) and/or Multi-User (MU) communication of Downlink (DL) and/or Uplink frames (UL) using a MIMO scheme. For example, the EDMG STA may be configured to implement one or more channel bonding mechanisms, which may, for example, support communication over a channel bandwidth (BW) (also referred to as a "wide channel", an "EDMG channel", or a "bonded channel") including two or more channels, e.g., two or more 2.16 GHz channels. For example, the channel bonding mechanisms may include, for example, a mechanism and/or an operation whereby two or more channels, e.g., 2.16 GHz channels, can be combined, e.g., for a higher bandwidth of packet transmission, for example, to enable achieving higher data rates, e.g., when compared to transmissions over a single channel. Some demonstrative aspects are described herein with respect to communication over a channel BW including two or more 2.16 GHz channels, however other aspects may be implemented with respect to communications over a channel bandwidth, e.g., a "wide" channel, including or formed by any other number of two or more channels, for example, an aggregated channel including an aggregation of two or more channels. For example, the EDMG STA may be configured to implement one or more channel bonding mechanisms, which may, for example, support an increased channel bandwidth, for example, a channel BW of 4.32 GHz, a channel BW of 6.48 GHz, a channel BW of 8.64 GHz, and/or any other additional or alternative channel BW. The EDMG STA may perform other additional or alternative functionality.

In other aspects, the mmWave STA may include any other type of STA and/or may perform other additional or alternative functionality. Other aspects may be implemented by any other apparatus, device and/or station.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one or more other devices.

In some demonstrative aspects, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, one or more channels in a 2.4 GHz wireless communication frequency band, one or more channels in a 5 GHz wireless communication frequency band, and/or one or more channels in a 6 GHz wireless communication frequency band. For example, WM 103 may additionally or alternatively include one or more channels in a mmWave wireless communication frequency band.

In other aspects, WM 103 may include any other type of channel over any other frequency band.

In some demonstrative aspects, device 102 and/or device 140 may include one or more radios including circuitry and/or logic to perform wireless communication between devices 102, 140 and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a sub-10 Ghz band, for example, 2.4 GHz band, a 5 GHz band, a 6 GHz band, and/or any other sub-10 GHz band; and/or an mmWave band, e.g., a 45 Ghz band, a 60 Ghz band. and/or any other mmWave band: and/or any other band, e.g., a 5G band, an S1G band, and/or any other band.

In some demonstrative aspects, radios 114 and/or 144 may include, or may be associated with one or more, e.g., a plurality of, antennas.

In some demonstrative aspects, device 102 may include one or more, e.g., a plurality of, antennas 107, and/or device 140 may include on or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102 and/or device 140 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In some demonstrative aspects, device 102 and/or device 140 may include, operate as, perform the role of, and/or perform one or more functionalities of, one or more mmWave STAs, e.g., DMG STAs, EDMG STAs, and/or any other mmWave STA. For example, device 102 may include, operate as, perform the role of, and/or perform one or more functionalities of, one or more mmWave STAs, and/or device 140 may include, operate as, perform the role of, and/or perform one or more functionalities of, one or more mmWave STAs.

In other aspects, devices 102 and/or 140 may include, operate as, perform the role of, and/or perform one or more functionalities of, any other wireless device and/or station, e.g., a WLAN STA, a WiFi STA, and the like.

In some demonstrative aspects, device 102 and/or device 140 may be configured to operate as, perform the role of, and/or perform one or more functionalities of, an access point (AP), e.g., an EHT AP STA.

In some demonstrative aspects, device 102 and/or device 140 may be configured to operate as, perform the role of, and/or perform one or more functionalities of, a non-AP STA, e.g., an EHT non-AP STA.

In other aspects, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102 and/or 140 may be configured to communicate in an EHT network, and/or any other network.

In some demonstrative aspects, devices 102 and/or 140 may be configured to operate in accordance with one or more Specifications, for example, including one or more IEEE 802.11 Specifications, e.g., an IEEE 802.11-2020 Specification, an IEEE 802.11be Specification, an IEEE 802.11ay Specification and/or any other specification and/or protocol.

In some demonstrative aspects, device 102 and/or device 140 may include, operate as, perform a role of, and/or perform the functionality of, one or more multi-link logical entities, e.g., as described below.

In other aspect, device 102 and/or device 140 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102 and/or device 140 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102 and/or device 140 may be configured to operate as, perform the role of, and/or perform one or more functionalities of, an AP MLD.

In some demonstrative aspects, device 102 and/or device 140 may be configured to operate as, perform the role of, and/or perform one or more functionalities of, a non-AP MLD.

In other aspects, device 102 and/or device 140 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to control, perform and/or to trigger, cause, instruct and/or control device 102 to operate as, perform a role of, and/or perform one or more operations and/or functionalities of, an AP MLD 131 including a plurality of STAs 133, e.g., including an AP STA 135, an AP STA 137, an AP STA 139, and/or an mmWave STA 141. In some aspects, as shown in FIG. 1, AP MLD 131 may four STAs. In other aspects, AP MLD 131 may include any other number of STAs.

In one example, AP STA 135, AP STA 137, AP STA 139, and/or mmWave STA 141 may operate as, perform a role of, and/or perform one or more operations and/or functionalities of, an EHT AP STA. In other aspects, AP STA 135, AP STA 137, AP STA 139, and/or mmWave STA 141 may perform any other additional or alternative functionality.

In some demonstrative aspects, mmWave STA 141 may operate as, perform a role of, and/or perform one or more operations and/or functionalities of, a mmWave AP STA. In other aspects, mmWave STA 141 may operate as, perform a role of, and/or perform one or more operations and/or functionalities of an mmWave network controller to control communication over an mmWave wireless communication network.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, for example, the one or more radios 114 may include, for example, a radio for communication by mmWave STA 141 over a fourth wireless communication frequency channel and/or frequency band, e.g., an mmWave band, for example, a wireless communication band above 45 Ghz, for example, a 6-GHz band or any other mmWave band, e.g., as described below.

In some demonstrative aspects, the radios 114 utilized by STAs 133 may be implemented as separate radios. In other aspects, the radios 114 utilized by STAs 133 may be implemented by one or more shared and/or common radios and/or radio components.

In other aspects controller 124 may be configured to control, perform and/or to trigger, cause, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to control, perform and/or to trigger, cause, instruct and/or control device 140 to operate as, perform a role of, and/or perform one or more operations and/or functionalities of, an MLD 151 including a plurality of STAs 153, e.g., including a STA 155, a STA 157, a STA 159, and/or a STA 161. In some aspects, as shown in FIG. 1, MLD 151 may include four STAs. In other aspects, MLD 151 may include any other number of STAs.

In one example, STA 155, STA 157, STA 159, and/or STA 161 may operate as, perform a role of, and/or perform one or more operations and/or functionalities of, an EHT STA. In other aspects, STA 155, STA 157, STA 159, and/or STA 161 may perform any other additional or alternative functionality.

In some demonstrative aspects, STA 161 may be configured to operate as, perform a role of, and/or perform one or more operations and/or functionalities of, an mmWave STA, e.g., as described below. For example, the mmWave STA 161 may be configured to operate as, perform a role of, and/or perform one or more operations and/or functionalities of, a non-AP mmWave STA, e.g., as described below.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, for example, the one or more radios 144 may include, for example, a radio for communication by mmWave STA 161 over a fourth wireless communication frequency channel and/or frequency band, e.g., a mmWave band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to control, perform and/or to trigger, cause, instruct and/or control MLD 151 to operate as, perform a role of, and/or perform one or more operations and/or functionalities of, a non-AP MLD. For example, STA 155, STA 157, STA 159, and/or mmWave STA 161 may operate as, perform a role of, and/or perform one or more operations and/or functionalities of, a non-AP STA, e.g., a non-AP EHT STA.

In some demonstrative aspects, controller 154 may be configured to control, perform and/or to trigger, cause, instruct and/or control MLD 151 to operate as, perform a role of, and/or perform one or more operations and/or functionalities of, an AP MLD. For example, STA 155, STA 157, STA 159, and/or mmWave STA 161 may operate as, perform a role of, and/or perform one or more operations and/or functionalities of, an AP EHT STA.

In other aspects controller 154 may be configured to control, perform and/or to trigger, cause, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
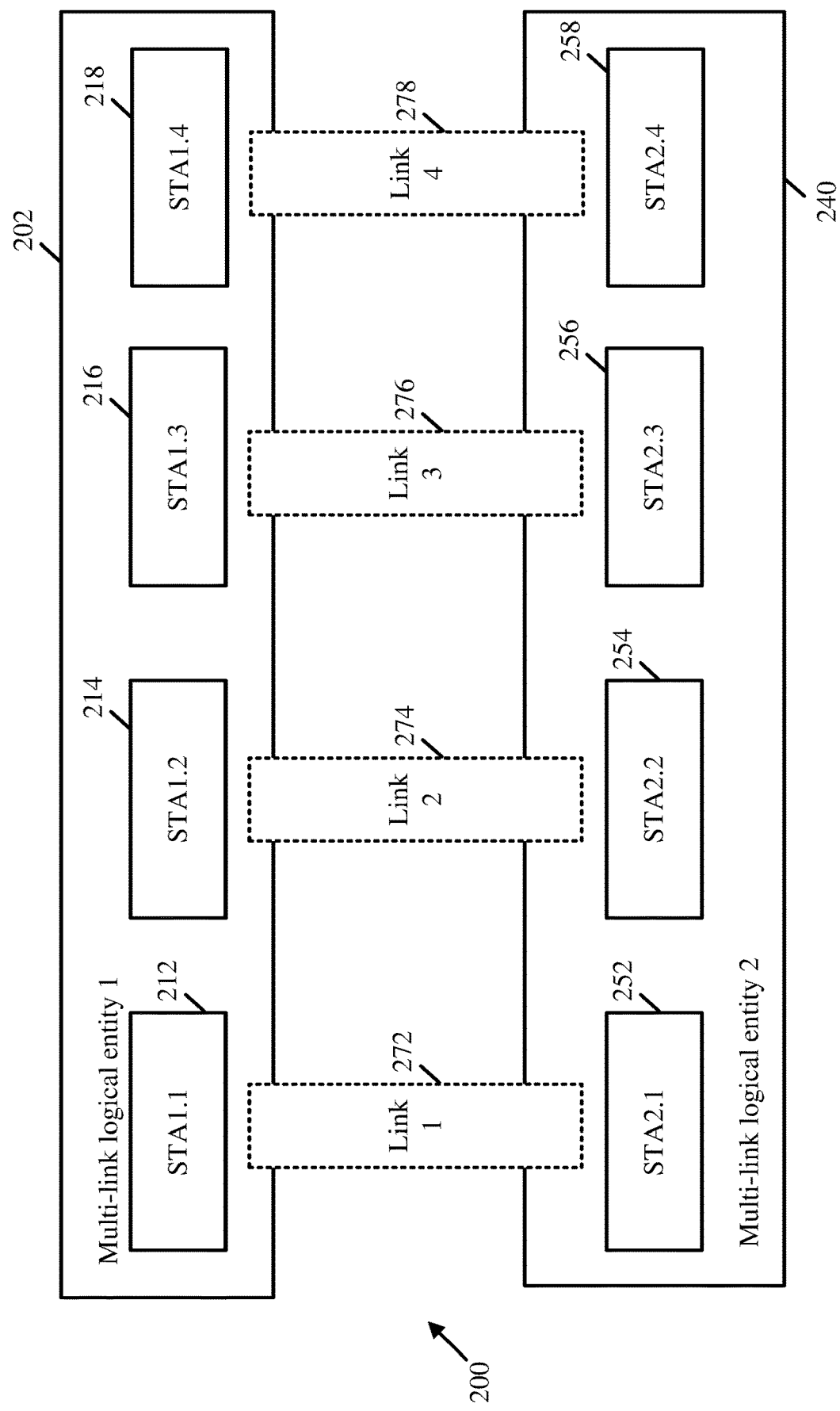
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, a STA 216, and a STA 218. In one example, AP MLD 131 (FIG. 1) may perform one or more operations of, one or more functionalities of, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, a STA 256, and a STA 258. In one example, MLD 151 (FIG. 1) may perform one or more operations of, one or more functionalities of, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, a link 276 between STA 216 and STA 256, and/or a link 278 between STA 218 and STA 258.

Figure 3:
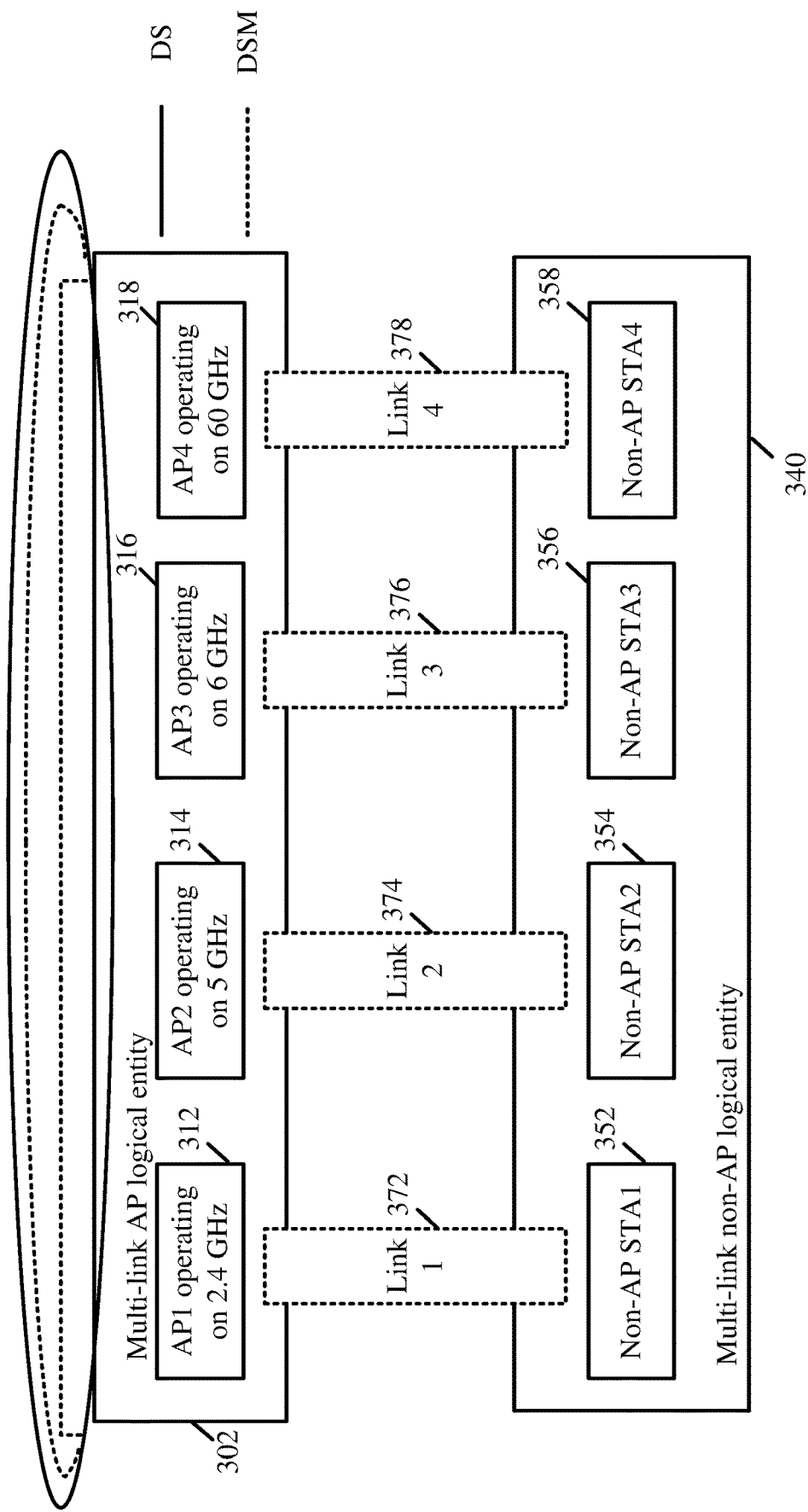
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, an AP STA 316, and an mmWave STA 318. In one example, AP MLD 131 (FIG. 1) may perform one or more operations of, one or more functionalities of, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, a non-AP STA 356, and an mmWave STA 358. In one example, MLD 151 (FIG. 1) may perform one or more operations of, one or more functionalities of, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, a link 376 between AP STA 316 and non-AP STA 356, and/or a link 378 between mmWave STA 318 and mmWave STA 358.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, AP STA 316 may be configured to communicate over a 6 Ghz frequency band, and/or mmWave STA 318 may be configured to communicate over a mmWave frequency band. In other aspects, AP STA 312, AP STA 314, AP STA 316, and/or mmWave STA 318 may be configured to communicate over any other additional or alternative wireless communication frequency bands.

Referring back to FIG. 1, in some demonstrative aspects, device 102 and/or device 140 may be configured to support a technical solution for communication between mmWave STAs, e.g., mmWave STA 141 and mmWave STA 161, over the mmWave frequency band, e.g., as described below.

In some demonstrative aspects, device 102 and/or device 140 may be configured to support a technical solution to utilize communications over the sub-10 GHz frequency band, for example, to assist one or more operations to be performed by the mmWave STAs, e.g., mmWave STA 141 and mmWave STA 161, over the mmWave frequency band, e.g., as described below.

In some demonstrative aspects, device 102 and/or device 140 may be configured to support a technical solution to utilize communications over the sub-10 GHz frequency band, for example, to assist a Transmit Sector Sweep (TXSS) procedure to be performed by the mmWave STAs, e.g., mmWave STA 141 and mmWave STA 161, over the mmWave frequency band, e.g., as described below.

In some demonstrative aspects, device 102 and/or device 140 may be configured to support a technical solution to utilize communications over the sub-10 GHz frequency band, for example, to assist in triggering and/or setting up the TXSS procedure to be performed by the mmWave STAs, e.g., mmWave STA 141 and mmWave STA 161, over the mmWave frequency band, e.g., as described below.

In some demonstrative aspects, device 102 and/or device 140 may be configured to support a technical solution to utilize communications over the sub-10 GHz frequency band, for example, to assist in communicating feedback of the TXSS procedure between the mmWave STAs, e.g., mmWave STA 141 and mmWave STA 161, e.g., as described below.

In some demonstrative aspects, device 102 and/or device 140 may be configured to support a technical solution to utilize communications over the sub-10 GHz frequency band, for example, to reduce an overhead of one or more operations to be performed by the mmWave STAs, e.g., mmWave STA 141 and mmWave STA 161, over the mmWave frequency band, e.g., as described below.

In some demonstrative aspects, device 102 and/or device 140 may be configured to support a technical solution to utilize communications over the sub-10 GHz frequency band, for example, to reduce an overhead of one or mor procedures for station discovery and/or initial beamforming (BF) training in the mmWave band, e.g., as described below.

For example, station discovery and initial beamforming training in mmWave channels, e.g., 60 GHz channels, may be a significant source of overhead to wireless communication systems. Accordingly, it may be advantageous to implement a technical solution to reduce the overhead of these procedures, and/or any other additional or alternative procedures over the mmWave band. For example, reducing the overhead of the procedures over the mmWave band may contribute to reducing system latency and/or power consumption.

In some demonstrative aspects, device 102 and/or device 140 may be configured to perform one or more operations of a procedure (also referred to as "sub-10 Ghz assisted procedure"), which may make use of an existing sub-10 Ghz link, e.g., a sub-7 GHz link, between two STAs that intend to establish an mmWave link, e.g., a 60 GHz link, to exchange discovery and/or beamforming training-related information, e.g., as described below.

In some demonstrative aspects, the sub-10 Ghz assisted procedure may include an initiation phase, which may include one or more operations and/or procedures to setup and/or initiate one or more beamforming procedures, e.g., as described below.

In some demonstrative aspects, the initiation phase may include one or more operations configured to initiate an mmWave discovery and initial beamforming process. For example, a 60 GHz discovery and initial beamforming process between two STAs may be initiated with an exchange of related information (also referred to as "mmWave assistance information") on an existing sub-7 GHz link between the same two STAs, e.g., as described below.

For example, the mmWave assistance information may include system parameters and/or a target start time to initiate the beamforming process, e.g., as described below.

In some demonstrative aspects, the sub-10 Ghz assisted procedure may include a beamforming execution phase, which may include one or more operations and/or procedures to execute the one or more beamforming procedures, e.g., as described below.

In some demonstrative aspects, the beamforming execution phase may include one or more operations configured to execute the discovery and initial beamforming training in the mmWave band, e.g., in the 60 GHz band, e.g., as described below.

In some demonstrative aspects, the beamforming training may include a transmit sector-sweep (TXSS), which may be performed by an mmWave STA of the two mmWave STAs, e.g., an mmWave STA performing a role of an AP or an mmWave network controller, e.g., as described below.

In some demonstrative aspects, the beamforming training may include any other additional or alternative beamforming training procedures.

In some demonstrative aspects, the sub-10 Ghz assisted procedure may include a feedback phase, which may include communication of feedback corresponding to the beamforming process over the sub-10 Ghz band, e.g., as described below.

In some demonstrative aspects, the feedback phase may include feedback of the discovery and initial beamforming training process, which may be exchanged on the existing sub-7 GHz link, e.g., as described below.

In some demonstrative aspects, the sub-10 Ghz assisted procedure may be implemented to provide a technical solution to reduce an overhead, e.g., a significant overhead, of the processes of station discovery and/or initial beamforming training for mmWave systems, e.g., 60 GHz 802.11 systems.

In some demonstrative aspects, the sub-10 Ghz assisted procedure may be configured for implementation by a first STA and a second STA, which support one or more sub-10 Ghz PHYs, e.g., sub-7 GHz PHYs, for example, including, but not limited to, a legacy sub-GHz PHY, e.g., a non High-Throughput (HT) (non-HT) PHY, a HT PHY, a Very High Throughput (VHT), a High Efficiency (HE) PHY, an EHT PHY, and/or any other PHY supporting sub-10 Ghz, e.g., sub-7 GHz communications, e.g., in accordance with an IEEE 802.11 Specification and/or any other Specification or protocol; and one or more mmWave PHYs, e.g., 60 GHz PHYs, for example, including, but not limited to, a DMG PHY, an EDMG PHY, and/or any other PHY supporting mmWave, e.g., 60 GHz communications, e.g., in accordance with an IEEE 802.11 Specification and/or any other Specification or protocol.

In some demonstrative aspects, the sub-10 Ghz assisted procedure may be configured for implementation by the first STA, e.g., a STA implemented by device 102, and the second STA, e.g., a STA implemented by device 140, to perform discovery and/or initial beamforming training in the mmWave band, e.g., the 60 GHz band, for example, by exchanging related information on an existing sub-10 Ghz link, e.g., a sub-7 GHz link, as described below.

In some demonstrative aspects, the sub-10 Ghz assisted procedure may be configured for implementation by two STAs that have a sub-7 GHz link established to perform 60 GHz discovery and/or initial beamforming through the following three phases:

1. Phase 1: The 60 GHz discovery and initial beamforming process is initiated with the exchange of related information, including system parameters and target start time, on an existing sub-7 GHz link;
2. Phase 2: Discovery and initial beamforming training are performed in the 60 GHz band by means of a transmit sector-sweep by the AP and possibly other beamforming training procedures; and
3. Phase 3: Feedback of the discovery and initial beamforming process is exchanged on an existing sub-7 GHz link.

In some demonstrative aspects, controller 124 may be configured to cause an AP device implemented by device 102 to transmit a trigger frame from a sub-10 GHz AP of the AP device over a sub-10 GHz wireless communication channel, e.g., as described below.

For example, controller 124 may be configured to cause AP MLD 131 and/or any other AP device including a plurality of AP STAs, to transmit the trigger frame from AP 135, AP 137 and/or AP 139 over the sub-10 GHz wireless communication channel, e.g., as described below.

In some demonstrative aspects, the trigger frame may be configured to trigger a Transmit Sector Sweep (TXSS) procedure over an mmWave wireless communication channel, e.g., as described below.

In some demonstrative aspects, controller 124 may be configured to cause the AP device implemented by device 102 to transmit, e.g., based on the trigger frame, a sequence of sector sweep packets of the TXSS procedure from an mmWave AP of the AP device over the mmWave wireless communication channel, e.g., as described below.

For example, controller 124 may be configured to cause AP MLD 131 and/or any other AP device including a plurality of AP STAs, to transmit the sequence of sector sweep packets of the TXSS procedure from mmWave AP 141 over the mmWave wireless communication channel, e.g., as described below.

In some demonstrative aspects, controller 124 may be configured to cause the AP device implemented by device 102 to process a feedback frame from a non-AP device to identify feedback information based on the sequence of sector sweep packets, e.g., as described below.

For example, controller 124 may be configured to cause AP MLD 131 and/or any other AP device including a plurality of AP STAs, to process a feedback frame from a non-AP device implemented by device 140, e.g., non-AP MLD 151, to identify feedback information based on the sequence of sector sweep packets, e.g., as described below.

In some demonstrative aspects, the feedback frame may be received at the sub-10 GHz AP over the sub-10 GHz wireless communication channel, e.g., after the TXSS procedure, e.g., as described below.

For example, the feedback frame may be received at AP 135, AP 137 and/or AP 139 over the sub-10 GHz wireless communication channel after the TXSS procedure.

In some demonstrative aspects, the AP device implemented by device 102 may include an AP MLD, e.g., AP MLD 131. In other aspects, device 102 may implement any other type of AP device including a plurality of AP STAs, e.g., including the STAs 135, 137, 139 and/or 141.

In some demonstrative aspects, the sub-10 GHz wireless communication channel may include a sub-7 GHz channel, e.g., as described below. In other aspects, the sub-10 GHz wireless communication channel may include a channel in any other sub-10 GHz frequency band, e.g., below 7 GHz or above 7 GHz.

In some demonstrative aspects, the mmWave wireless communication channel may include a 60 GHz channel. In other aspects, the mmWave wireless communication channel may include any other mmWave channel.

In some demonstrative aspects, controller 124 may be configured to control at least one radio 114 to communicate the trigger frame and the feedback frame over the sub-10 GHz wireless communication channel, and to transmit the sequence of sector sweep packets over the mmWave wireless communication channel, e.g., as described below.

In some demonstrative aspects, controller 124 may be configured to cause the AP device implemented by device 102 to configure the sequence of sector sweep packets of the TXSS procedure, for example, based on one or more TXSS procedure parameters negotiated with the non-AP device over the sub-10 GHz wireless communication channel, e.g., as described below.

In some demonstrative aspects, the one or more TXSS procedure parameters may include a channel parameter to configure the mmWave wireless communication channel, e.g., as described below.

In some demonstrative aspects, the one or more TXSS procedure parameters may include a sector count of sectors of the mmWave AP, e.g., as described below.

In some demonstrative aspects, the one or more TXSS procedure parameters may include a Training (TRN) length of a TRN field to be included in the sector sweep packets, e.g., as described below.

In some demonstrative aspects, the one or more TXSS procedure parameters may include a TRN unit configuration parameter to indicate a TRN unit configuration of the TRN field, e.g., as described below.

In some demonstrative aspects, the one or more TXSS procedure parameters may include a sector sweep packet type of the sector sweep packets, e.g., as described below.

In some demonstrative aspects, the one or more TXSS procedure parameters may include timing information to synchronize communications over the mmWave wireless communication channel, e.g., as described below.

In some demonstrative aspects, the one or more TXSS procedure parameters may include any other additional or alternative parameters.

In some demonstrative aspects, the trigger frame may include timing information to indicate a timing to initiate the TXSS procedure, e.g., as described below.

In some demonstrative aspects, the trigger frame may include a single-user trigger frame addressed to a single non-AP device, e.g., as described below.

In some demonstrative aspects, the single-user trigger frame may be configured to trigger the TXSS procedure for the single non-AP device, e.g., as described below.

In some demonstrative aspects, the trigger frame may include a multi-user trigger frame addressed to a plurality of non-AP devices, e.g., as described below.

In some demonstrative aspects, the multi-user trigger frame may be configured to trigger the TXSS procedure for the plurality of non-AP devices, e.g., as described below.

In some demonstrative aspects, the multi-user trigger frame may include multi-user timing information to indicate a timing to initiate the TXSS procedure, for example, at a same timing for two or more non-AP devices of the plurality of non-AP devices, e.g., as described below.

In some demonstrative aspects, the multi-user trigger frame may include user-specific timing information to indicate a separate timing for different non-AP devices, e.g., as described below.

In some demonstrative aspects, the user-specific timing information may indicate a first timing to initiate the TXSS procedure for a first non-AP device of the plurality of non-AP devices, and a second timing, different from the first timing, to initiate the TXSS procedure for a second non-AP device of the plurality of non-AP devices, e.g., as described below.

In some demonstrative aspects, controller 124 may be configured to cause the AP device implemented by device 102 to transmit a feedback trigger frame from the sub-10 Ghz AP to the non-AP device over the sub-10 GHz wireless communication channel after the TXSS procedure, e.g., as described below.

In some demonstrative aspects, the feedback trigger frame may be configured to trigger the non-AP device to transmit the feedback frame, e.g., as described below.

For example, controller 124 may be configured to cause AP MLD 131 and/or any other AP device including a plurality of AP STAs, to transmit the feedback trigger frame from AP 135, AP 137 and/or AP 139 over the sub-10 GHz wireless communication channel, e.g., as described below.

In some demonstrative aspects, the feedback frame may include an unsolicited frame, which is not triggered by the sub-10 GHz AP, e.g., as described below.

In some demonstrative aspects, the feedback information may correspond to a best sector sweep packet received by the non-AP device during the TXSS procedure, e.g., as described below.

In some demonstrative aspects, controller 124 may be configured to cause the AP device implemented by device 102 to transmit an other trigger frame from the sub-10 GHz AP to the non-AP device over the sub-10 Ghz wireless communication channel, for example, after the feedback frame, e.g., as described below.

In some demonstrative aspects, the other trigger frame may be configured to trigger a BF training procedure including one or more BF transmissions from the non-AP device to the mmWave AP over the mmWave wireless communication channel, e.g., as described below.

In some demonstrative aspects, controller 124 may be configured to cause the mmWave AP, e.g., mmWave STA 141, to reserve a wireless medium over the mmWave wireless communication channel for a duration of the TXSS procedure, e.g., as described below.

In some demonstrative aspects, controller 154 may be configured to cause a non-AP device implemented by device 140 to process a trigger frame from an AP device, for example, from the AP device implemented by device 102, e.g., as described below.

In some demonstrative aspects, the trigger frame may be received at a sub-10 GHz non-AP STA of the non-AP device over a sub-10 GHz wireless communication channel, e.g., as described below.

For example, the trigger frame may be received at STA 155, STA 157 and/or STA 159 over the sub-10 GHz wireless communication channel, e.g., as described below.

In some demonstrative aspects, the trigger frame configured to trigger a TXSS procedure over an mmWave wireless communication channel, e.g., as described below.

In some demonstrative aspects, controller 154 may be configured to cause the non-AP device implemented by device 140 to operate a mmWave non-AP STA of the non-AP device, e.g., based on the trigger frame, to receive from the AP device one or more sector sweep packets of a sequence of sector sweep packets of the TXSS procedure over the mmWave wireless communication channel, e.g., as described below.

For example, controller 154 may be configured to operate mmWave STA 161, e.g., based on the trigger frame, to receive from the AP device implemented by device 102 one or more sector sweep packets of a sequence of sector sweep packets of the TXSS procedure over the mmWave wireless communication channel, e.g., as described below.

In some demonstrative aspects, controller 154 may be configured to cause the non-AP device implemented by device 140 to transmit a feedback frame from the sub-10 GHz non-AP STA to the AP device over the sub-10 GHz wireless communication channel, for example, after the TXSS procedure, e.g., as described below.

In some demonstrative aspects, the feedback frame may include feedback information based on the one or more sector sweep packets, e.g., as described below.

For example, controller 154 may be configured to cause MLD 151 and/or any other non-AP device including a plurality of non-AP STAs, to transmit the feedback frame from STA 155, STA 157 and/or STA 159 over the sub-10 GHz wireless communication channel, e.g., as described below.

In some demonstrative aspects, the non-AP device implemented by device 140 may include a non-AP MLD, e.g., MLD 151. In other aspects, device 102 may implement any other type of non-AP device including a plurality of non-AP STAs, e.g., including the STAs 155, 157, 159 and/or 151.

In some demonstrative aspects, the sub-10 GHz wireless communication channel may include a sub-7 GHz channel, e.g., as described below. In other aspects, the sub-10 GHz wireless communication channel may include a channel in any other sub-10 GHz frequency band, e.g., below 7 GHz or above 7 GHz.

In some demonstrative aspects, the mmWave wireless communication channel may include a 60 GHz channel. In other aspects, the mmWave wireless communication channel may include any other mmWave channel.

In some demonstrative aspects, controller 154 may be configured to control at least one radio 144 to communicate the trigger frame and the feedback frame over the sub-10 GHz wireless communication channel, and to receive the one or more sector sweep packets over the mmWave wireless communication channel, e.g., as described below.

In some demonstrative aspects, controller 154 may be configured to cause the non-AP device implemented by device 140 to operate the mmWave non-AP STA, e.g., mmWave STA 161, to receive the one or more sector sweep packets, for example, based on one or more TXSS procedure parameters negotiated with the AP device over the sub-10 GHz wireless communication channel, e.g., as described below.

In some demonstrative aspects, the one or more TXSS procedure parameters may include at least one of a channel parameter to configure the mmWave wireless communication channel, a sector count of sectors of the AP device, a TRN length of a TRN field to be included in the sector sweep packets, a TRN unit configuration parameter to indicate a TRN unit configuration of the TRN field, a sector sweep packet type of the sector sweep packets, and/or timing information to synchronize communications over the mmWave wireless communication channel, e.g., as described below. In other aspects, the one or more TXSS procedure parameters may include any other additional or alternative parameters.

In some demonstrative aspects, the trigger frame may include timing information to indicate a timing to initiate the TXSS procedure, e.g., as described below.

In some demonstrative aspects, the trigger frame may include a single-user trigger frame addressed to the sub-10 GHz non-AP STA, e.g., as described below.

In some demonstrative aspects, the trigger frame may include a multi-user trigger frame addressed to a plurality of non-AP devices, e.g., as described below.

In some demonstrative aspects, controller 154 may be configured to cause the non-AP device implemented by device 140 to identify in the trigger frame multi-user timing information to indicate a timing to initiate the TXSS procedure at a same timing for two or more non-AP devices, e.g., as described below.

In some demonstrative aspects, controller 154 may be configured to cause the non-AP device implemented by device 140 to identify in the trigger frame user-specific timing information to indicate a timing to initiate the TXSS procedure for the mmWave non-AP STA, e.g., as described below.

In some demonstrative aspects, controller 154 may be configured to cause the sub-10 GHz non-AP STA implemented by device 140, e.g., STA 155, STA 157, and/or STA 159, to transmit the feedback frame based on a feedback trigger frame received from the AP device over the sub-10 GHz wireless communication channel after the TXSS procedure, e.g., as described below.

In some demonstrative aspects, controller 154 may be configured to cause the sub-10 GHz non-AP STA implemented by device 140, e.g., STA 155, STA 157, and/or STA 159, to transmit the feedback frame as an unsolicited frame, which is not triggered by the AP device, e.g., as described below.

In some demonstrative aspects, controller 154 may be configured to cause the non-AP device implemented by device 140 to determine the feedback information corresponding to a best sector sweep packet received by the sub-10 GHz non-AP STA during the TXSS procedure, e.g., as described below.

In some demonstrative aspects, controller 154 may be configured to cause the non-AP device implemented by device 140 to process an other trigger frame received at the sub-10 GHZ non-AP STA from the AP device over the sub-10 Ghz wireless communication channel, for example, after the feedback frame, e.g., as described below.

In some demonstrative aspects, controller 154 may be configured to cause the non-AP device implemented by device 140 to transmit one or more BF transmissions of a BF training procedure, e.g., based on the other trigger frame, from the mmWave non-AP STA to the AP device over the mmWave wireless communication channel, e.g., as described below.

Figure 4:
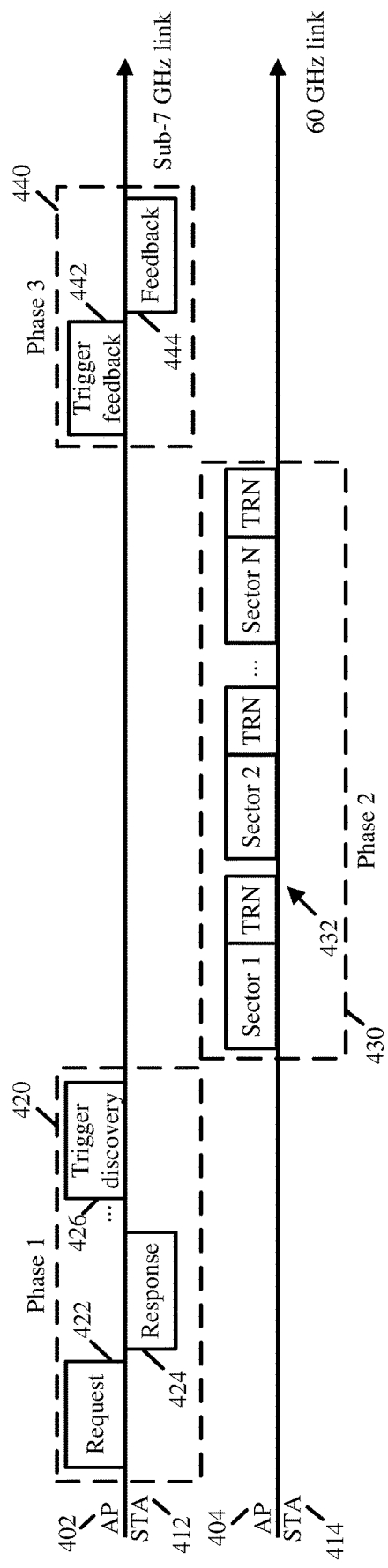
FIG. 4 is a schematic illustration of communications of a Transmit Sector Sweep (TXSS) procedure over a millimeterWave (mmWave) wireless communication channel assisted by communications over a sub 10 Gigahertz (GHz) (sub-10 GHz) wireless communication channel, in accordance with some demonstrative aspects.

Reference is made to FIG. 4, which schematically illustrates communications of a TXSS procedure over an mmWave wireless communication channel assisted by communications over a sub-10 GHz wireless communication channel, in accordance with some demonstrative aspects.

In some demonstrative aspects, as shown in FIG. 4, one or more operations of the procedure of FIG. 4 may be performed by an AP device including a sub-10 Ghz AP 402 and an mmWave AP 404, and a non-AP device including a sub-10 Ghz non-AP STA 412 and an mmWave non-AP STA 414, e.g., as described below. For example, controller 124 (FIG. 1) may be configured to control, trigger, and/or cause the AP device implemented by device 102 (FIG. 1) to perform a role of, one or more operations of, and/or one or more functionalities of, the AP device including sub-10 Ghz AP 402 and mmWave AP 404; and/or controller 154 (FIG. 1) may be configured to control, trigger, and/or cause the non-AP device implemented by device 140 (FIG. 1) to perform a role of, one or more operations of, and/or one or more functionalities of, the non-AP device including sub-10 Ghz non-AP STA 412 and mmWave non-AP STA 414.

In some demonstrative aspects, as shown in FIG. 4, two STAs, e.g., the AP STA and the non-AP STA, that have a link established in a sub-7 GHz band may intend to establish a 60 GHz link as well.

In some demonstrative aspects, as shown in FIG. 4, the AP STA and the non-AP STA may perform one or more operations of a phase ("phase 1") 420, which may be configured to trigger 60 GHz discovery and initial beamforming, e.g., as described below.

In some demonstrative aspects, as shown in FIG. 4, a frame exchange, e.g., including a request frame 422 and a response frame 424, may be performed between the two STAs, during which capabilities and/or operating parameters related to 60 GHz operation may be exchanged.

In some demonstrative aspects, as shown in FIG. 4, the start of the discovery and initial beamforming, e.g., in the 60 GHz band, may be "triggered" by the AP, e.g., using a trigger frame 426.

In some demonstrative aspects, as shown in FIG. 4, the initial frame exchange between the two STAs, e.g., the frames 422 and/or 424, may include 60 GHz-related capabilities and/or operating parameters that may determine the configuration of the PPDUs used for the TXSS procedure, and/or an overall flow of the discovery and initial beamforming process that follows, e.g., as described below.

In some demonstrative aspects, the initial frame exchange between the two STAs, e.g., the frames 422 and/or 424, may be configured to indicate, signal, set and/or negotiate one or more of the following parameters to configure the TXSS procedure:

Channel number and bandwidth: Indicates the number of the 60 GHz channel used in phase 2 (and corresponding bandwidth);

Total Number of Sectors: Indicates the total number of transmit sectors the AP uses in a transmit sector sweep combined over all DMG antennas;

TRN Length: Indicates the number of TRN-Units used in beam refinement;

EDMG TRN-Unit M, EDMG TRN-Unit N, and/or EDMG TRN-Unit P:

Indicates the TRN-Unit configuration used in beam refinement;

Sector sweep frame type: Indicates the type of frame used in phase 2, which could be SSW frames, Short SSW PPDUs, EDMG BRP PPDUs, or other;

Timing synchronization function (TSF) information, such as target start time or target wake time (TWT), to determine time in the 60 GHz link; and/or Any other parameters.

In some demonstrative aspects, the initial frame exchange between the two STAs, may include two frames, e.g., the frames 422 and/or 424 (labeled request and response), for example, before the trigger frame 426 is sent to start a second phase (Phase 2) 430, as shown in FIG. 4.

In other aspects, the phase 420 may include more than the three frames 422, 424, and 426. For example, one or more additional frames may be exchanged between the two STAs, for example, to setup and./or negotiate the parameters to configure the TXSS procedure.

In some demonstrative aspects, the initial request for discovery and initial beamforming process may be initiated by the AP, e.g., as shown in FIG. 4. In other aspects, the initial request for discovery and initial beamforming process may be initiated by the non-A STA. For example, the request frame 422 may be transmitted by the STA, and the response frame 424 may be transmitted by the AP.

In some demonstrative aspects, the trigger frame 426 may be configured to define parameters to be used in the phase 2.

In some demonstrative aspects, the trigger frame 426 may be configured to define a target start time to initiate the phase 2.

In some demonstrative aspects, the trigger frame 426 may be sent by the AP.

In some demonstrative aspects, the trigger frame 426 may be followed by an acknowledgement (ACK) frame, which may be sent by the client STA, e.g., in the sub-7 GHz link.

In some demonstrative aspects, the trigger discovery frame 426 may be configured to enable and/or allow both the AP STA and the non-AP STA to operate at a power save mode over the mmWave band, e.g., 60 GHz band, for example, by turning off, or switching to a low power state, one or more 60 GHz radios. For example, the trigger discovery frame 426 may be configured to enable and/or allow both the AP STA and the non-AP STA to operate at the power save mode over the mmWave band, for example, for an undefined period of time, e.g., until 60 GHz operation is requested/indicated/initiated by the frame exchange in the sub-7 GHz link (phase 1), e.g., the trigger frame 426.

In some demonstrative aspects, the trigger discovery frame 426 may be configured to include TSF information, for example, to assist with TSF correction and/or to minimize a drift of the target start time, e.g., between the non-AP STA and the AP STA.

In some demonstrative aspects, the trigger discovery frame 426 may be configured to indicate, e.g., over the sub-7 GHz link, a timing for the start of phase 2, e.g., to be performed over the 60 GHz link.

In some demonstrative aspects, the trigger discovery frame 426 may be configured to indicate the timing of the phase 2, for example, using a format/definition/approach in accordance with a Target Wake Time (TWT) scheme, and/or other approach.

In some demonstrative aspects, the time indicated by the trigger discovery frame 426 may be defined to be longer than a pre-defined/pre-negotiated switching time constraint, which may be indicated by the non-AP MLD to the AP MLD, for example, during phase 1.

In some demonstrative aspects, the time indicated by the trigger discovery frame 426 may be defined to not be immediate. For example, In some demonstrative aspects, the time indicated by the trigger discovery frame 426 may be defined to indicate a number of time units, e.g., a slot time or any other time units, after the end of phase 1.

In some demonstrative aspects, the AP may be configured to reserve a time period for the phase 2 in the mmWave link, e.g., the 60 GHz link, for example, to avoid potential contention from other STAs during the period of phase 2 operations, e.g., as described below.

For example, the AP operating in the 60 GHz band in the same AP MLD may signal the reservation of the corresponding time period during which phase 2 is scheduled to happen.

In some demonstrative aspects, the AP may be configured to reserve a time period for the phase 2 in the mmWave link, for example, according to any suitable time reservation mechanism, e.g., in accordance with a time reservation mechanism of an IEEE 802.11ad/ay protocol. For example, the AP may be configured to reserve a time period for the phase 2 in the mmWave link, for example, by sending a frame, e.g., a Beacon or Announce frame, to allocate a Service period (SP) or any other reserved, allocated, and/or protected period, which may occupy the intended period of time for the phase 2. In one example, the Destination Association Identifier (AID) shall not be set to the broadcast address or any AIDs that correspond to existing associated STAs, for example, such that other associated STAs in the 60 GHz link will not try to access the medium during the scheduled time for phase 2 operations.

In some demonstrative aspects, the AP may be configured to reserve a time period for the phase 2 in the mmWave link, for example, according to one or more mechanisms, e.g., new mechanisms, which may be defined in the 60 GHz link. For example, a TWT mechanism, e.g., as may be defined in the sub 7-GHz band, may be extended to the 60 GHz link. For example, the AP operating in the 60 GHz link may advertise a TWT SP for a period covering the period of the phase 2 operations.

In some demonstrative aspects, the trigger discovery frame 426 may be configured as an individually addressed frame, e.g., addressed to a single STA.

In some demonstrative aspects, the trigger discovery frame 426 may be configured as a group addressed frame, e.g., addressed to a group of STAs.

In some demonstrative aspects, the AP may configure the trigger discovery frame 426 to be a group addressed frame, for example, to trigger multiple non-AP STAs to perform 60 GHz discovery and/or initial beamforming training, for example, by using the same set of PPDUs transmitted during the TXSS procedure of the Phase 2, e.g., as described below.

In some demonstrative aspects, the AP may utilize the trigger discovery frame 426 to perform multiple phase 2 procedures for different non-AP STAs. For example, a non-AP STA, e.g., each non-AP STA or each group of non-AP STAs, may be indicated different target times, and possibly, different parameters for the phase 2.

In some demonstrative aspects, as shown in FIG. 4, the AP STA and the non-AP STA may perform one or more operations of a phase ("phase 2") 430, which may be configured to perform mmWave discovery, e.g., 60 GHz discovery, and/or initial beamforming, e.g., as described below.

In some demonstrative aspects, as shown in FIG. 4, the AP may start a transmit sector sweep (TXSS) procedure 432, for example, at the time indicated in the trigger discovery frame 426, e.g., sent in the sub-7 GHz link during the phase 1.

In some demonstrative aspects, the AP may start the TXSS procedure, for example, once the AP is able to access the channel, for example, if/when a channel contention mechanism over the mmWave channel indicates that the medium is idle.

In some demonstrative aspects, the AP may be configured to allocate time for the phase 2, for example, according to a definition similar to Service Periods (SPs), e.g., in accordance with an IEEE 802.11 Specification. For example, time may be allocated by the AP to phase 2, for example, such that clear channel assessment may not be required and/or performed.

In some demonstrative aspects, in some use cases, scenarios and/or implementations a mechanism of clear channel assessment, e.g., via energy/preamble detection, may be favored, for example, to enhance co-existence with other STAs and/or systems.

In some demonstrative aspects, the TXSS procedure 432 may include one or more operations and/or communications, for example, in accordance with the IEEE 802.11-2020 Specification. In other aspects, the TXSS procedure 432 may include any other additional or alternative operations and/or communications.

For example, the TXSS procedure 432 may include transmission of a sequence of packets, with each of them using a different antenna weight vector (AWV), in such a way that the transmissions include all directions (that is, sectors) of coverage of the AP. For example, during the TXSS, the station may continuously try to detect a packet, and when it is able to lock to a frame, it decodes its header and data field. For example, the information contained in the payload may enable the station to associate to the AP.

In some demonstrative aspects, some, or even all, of the information necessary for the station to associate to the AP in the 60 GHz band may be exchanged between the AP and the STA in the sub-7 GHz link.

For example, the station may feedback to the AP the packet that it was able to successfully decode, for example, by using the sector ID field transmitted within the frame, allowing the AP to determine its transmit AWV. In one example, the feedback from the STA to the AP may be performed over the sub-7 GHz link, for example, during a phase 440 (phase 3), e.g., as described below.

In some demonstrative aspects, a number of sectors and/or a frame used in phase 2, e.g., during the TXSS 430, may be negotiated and/or indicated during phase 1, for example, via frames 422, 424 and/or 426.

In some demonstrative aspects, the AP's TXSS 430, the non-AP STA may be operable to use a quasi-omni antenna pattern.

In some demonstrative aspects, PPDUs transmitted during the TXSS 432 of the phase 2 may include a training (TRN) field. For example, the TRN field may be configured in accordance with IEEE 802.11-2020 Specification, and/or may have any other configuration. For example, the TRN field may include multiple repetitions of a basic sequence, which may be formed by the concatenation of Golay sequences, and may be configured to allow for the receiving STA to perform receive training. For example, as a result, the client STA may be able to determine an appropriate receive configuration for the packets it receives during the TXSS 432.

In some demonstrative aspects, the PPDUs transmitted during the TXSS 432 of the phase 2 may carry a Sector Sweep (SSW) frame, or a Short SSW frame, e.g., in accordance with an IEEE 802.11ad Specification and/or an IEEE 802.11 ay Specification.

In some demonstrative aspects, the PPDUs transmitted during the TXSS 432 of the phase 2 may be configured to include a new and possibly shorter frame.

In some demonstrative aspects, the PPDUs transmitted during the TXSS 432 of the phase 2 may be configured to include Null Data Packets (NDPs) to perform the TXSS 432.

In some demonstrative aspects, information obtained with the exchanged information shown in FIG. 4 may be enough for each of the AP and non-AP STA determine both transmit and receive settings, for example, if the two STAs are reciprocal.

In one example, a STA may be defined, e.g., by a DMG PHY and/or an EDMG PHY, as being Antenna Weight Vector (AWV)-level reciprocal, for example, if the transmit antenna pattern associated with an AWV is the same as the receive antenna pattern for the same AWV. For example, if a STA has AWV-level reciprocity, it is able to determine both its transmit and receive antenna settings by performing either transmit or receive training. For example, if the STA is non-reciprocal, its transmit and receive antenna setting may be obtained separately. Similarly, if a STA is DMG antenna-level reciprocal, separate trainings may also be performed. As a result, a STA may be defined as reciprocal, for example, if it is AWV-level reciprocal, and non-reciprocal, for example, if it is DMG antenna-level reciprocal or non-reciprocal.

In some demonstrative aspects, for example, if the assumption that both STAs are reciprocal does not hold, further beamforming training may be performed e.g., as described below.

In some demonstrative aspects, in a multi-user case, multiple non-AP STAs may perform the discovery and initial beamforming training procedure simultaneously, e.g., as described above. For example, the PPDUs transmitted in the TXSS 432 by the AP may be configured for use by multiple non-AP STAs, e.g., simultaneously, for example, such that each of the non-AP STAs may determine individual transmit and/or receive antenna settings.

In some demonstrative aspects, as shown in FIG. 4, the AP STA and the non-AP STA may perform one or more operations of a phase ("phase 3") 440, which may be configured to perform discovery and initial beamforming feedback, e.g., as described below.

In some demonstrative aspects, as shown in FIG. 4, after the completion of Phase 2, the AP may trigger, e.g., using a trigger frame 442, the transmission of feedback, e.g., in a feedback frame 444, by the client STA, for example, in the sub-10 GHz link, e.g., the sub-7 GHz link.

In some demonstrative aspects, the AP may contend for the channel and/or perform a channel access mechanism over the sub-10 GHz channel, e.g., the sub-7 GHz channel, for example, if the AP is not already the TxOP holder of the sub-10 GHz channel, e.g., the sub-7 GHz channel.

In some demonstrative aspects, the feedback frame 444 may be sent by the client STA, for example, if discovery and initial beamforming is successful, for example, if the client STA is able to detect at least one PPDU during the phase 2.

In some demonstrative aspects, the feedback frame 444 sent by the client STA may include an indication, e.g., an index, that corresponds to the best PPDU it received during TXSS, e.g., the PPDU with the highest SNR, or based on any other criteria; or an index list of viable sectors, e.g., all sectors that resulted in a received SNR greater than X dB, or any other criteria. In other aspects the feedback frame 444 may include any other information corresponding to the best PPDU and/or sector.

In some demonstrative aspects, the feedback frame 444 may include an SNR corresponding to the reported sectors.

In some demonstrative aspects, the report in feedback frame 444 may include an indication that the phase 2 was not successful, e.g., if the client STA is out of range and not able to detect none of the packets transmitted during TXSS 432.

In some demonstrative aspects, the exchange for communication of the feedback frame 444 in phase 3 may be initiated by the AP, e.g., as shown in FIG. 4.

In other aspects, the exchange for communication of the feedback frame 444 in phase 3 may be performed in an unsolicited manner. For example, the STA may be configured to access the sub-7 GHz medium to send feedback frame 444 as an unsolicited frame in an unsolicited manner, e.g., such that the AP does not trigger for the feedback.

In some demonstrative aspects, in a multi-user case multiple non-AP STAs may perform discovery and initial beamforming training using the same flow, e.g., the same phase 2 transmissions. For example, the procedure described above for phase 3 may be extended, for example, such that the AP may triggers a client STA, e.g., each client STA, for its individual feedback. In one example, the AP may send individually addressed "trigger feedback" frames, e.g. to each of the participating STAs. In another example, a group addressed frame may be used. For example, multiple non-AP STAs may report their feedback with the transmission of a multi-user PPDU.

In some demonstrative aspects, for example, in some use cases, scenarios, implementations and/or deployments, there may be a need to perform further beamforming training, for example, after phases 2 and 3 are performed. For example, further beamforming training may be performed for at least one of the following reasons:

The AP may want to perform a Beam Refinement Protocol (BRP) procedure, for example, to obtain better operating parameters. For example, the training performed by the AP in the phase 2 may be sectorized, e.g., based on a sector sweep procedure 432. For example, since the 60 GHz link was already initially trained ("closed"), the beamforming procedure can be triggered by using the 60 GHz link itself.

If the two STAs are not reciprocal, e.g., as described above, additional training may be performed, for example, to enable transmit and/or receive training of one or both STAs.

In some demonstrative aspects, the AP and the non-AP STA may select to perform one or more additional phases of beamforming training, for example, following the phase 3, e.g., as described below.

Figure 5:
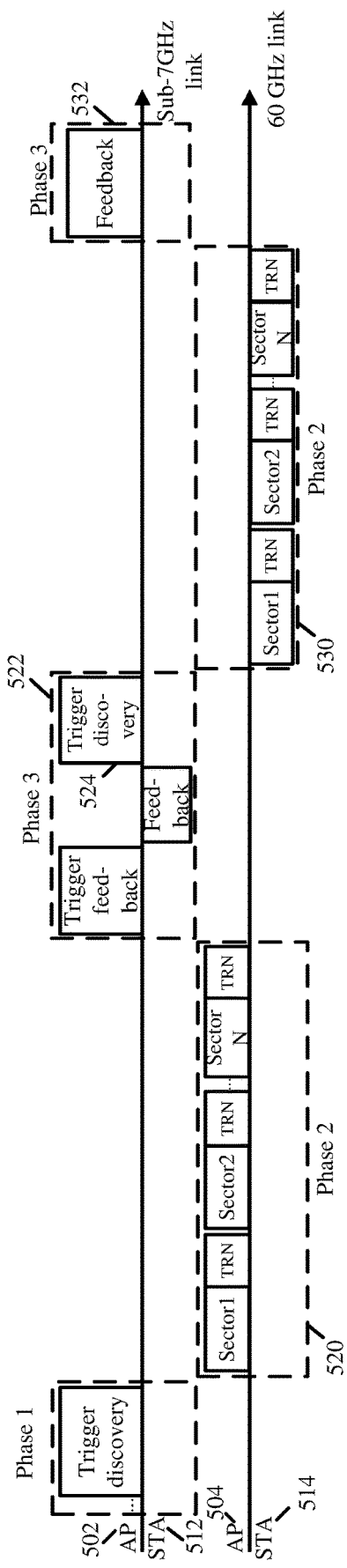
FIG. 5 is a schematic illustration of communications of a TXSS procedure over an mmWave wireless communication channel assisted by communications over a sub-10 GHz wireless communication channel, in accordance with some demonstrative aspects.

Reference is made to FIG. 5, which schematically illustrates communications of a TXSS procedure over an mmWave wireless communication channel assisted by communications over a sub-10 GHz wireless communication channel, in accordance with some demonstrative aspects.

In some demonstrative aspects, as shown in FIG. 5, one or more operations of the procedure of FIG. 5 may be performed by an AP device including a sub-10 Ghz AP 502 and an mmWave AP 504, and a non-AP device including a sub-10 Ghz non-AP STA 512 and an mmWave non-AP STA 514, e.g., as described below. For example, controller 124 (FIG. 1) may be configured to control, trigger, and/or cause the AP device implemented by device 102 (FIG. 1) to perform a role of, one or more operations of, and/or one or more functionalities of, the AP device including sub-10 Ghz AP 502 and mmWave AP 504; and/or controller 154 (FIG. 1) may be configured to control, trigger, and/or cause the non-AP device implemented by device 140 (FIG. 1) to perform a role of, one or more operations of, and/or one or more functionalities of, the non-AP device including sub-10 Ghz non-AP STA 512 and mmWave non-AP STA 514.

In some demonstrative aspects, as shown in FIG. 5, two STAs, e.g., the AP STA and the non-AP STA, that have a link established in a sub-7 GHz band may intend to establish a 60 GHz link as well.

In some demonstrative aspects, the AP STA and the non-AP STA may perform one or more operations of the phase 1, e.g., as described above with reference to FIG. 4.

In some demonstrative aspects, the AP STA and the non-AP STA may perform one or more repetitions of the phase 2 and/or the phase 3, e.g., as shown in FIG. 5, for example, in case both the AP STA and the non-AP STA are non-reciprocal.

In some demonstrative aspects, as shown in FIG. 5, in a first phase-2 520, the transmit settings of the AP and the receive settings of the client may be obtained. For example, feedback of the obtained results may be sent during a first phase-3 522.

In some demonstrative aspects, the first phase-3 522 may also include a trigger discovery frame 524, which may be used to start a second phase-2 530.

In some demonstrative aspects, during the second phase-2 530, the receive settings of the AP and/or the transmit settings of the client are obtained. For example, feedback of the transmit settings of the client STA may be sent to the AP, for example, during a second phase-3 532.

Figure 6:
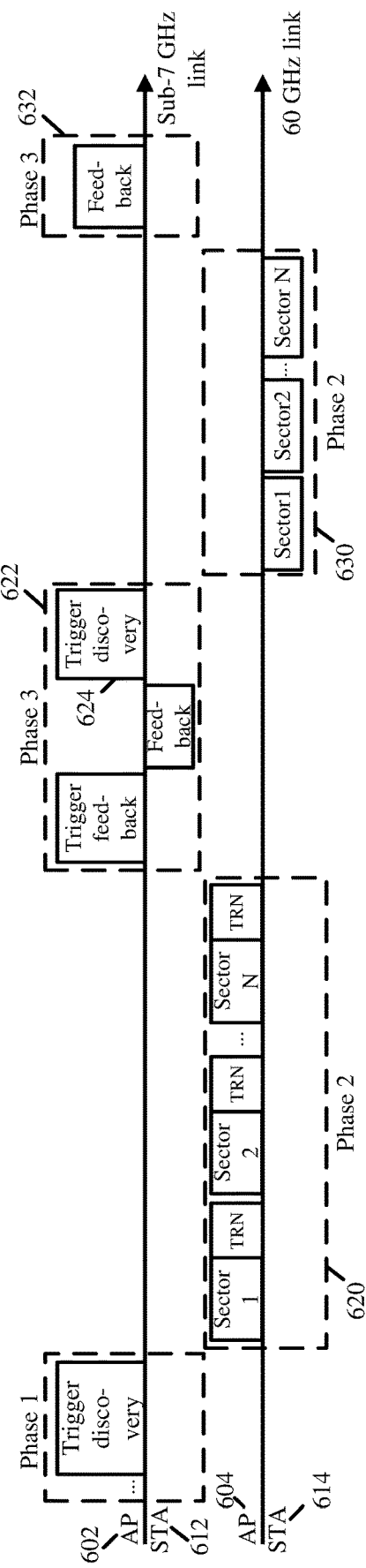
FIG. 6 is a schematic illustration of communications of a TXSS procedure over an mmWave wireless communication channel assisted by communications over a sub-10 GHz wireless communication channel, in accordance with some demonstrative aspects.

Reference is made to FIG. 6, which schematically illustrates communications of a TXSS procedure over an mmWave wireless communication channel assisted by communications over a sub-10 GHz wireless communication channel, in accordance with some demonstrative aspects.

In some demonstrative aspects, as shown in FIG. 6, one or more operations of the procedure of FIG. 6 may be performed by an AP device including a sub-10 Ghz AP 602 and an mmWave AP 604, and a non-AP device including a sub-10 Ghz non-AP STA 612 and an mmWave non-AP STA 614, e.g., as described below. For example, controller 124 (FIG. 1) may be configured to control, trigger, and/or cause the AP device implemented by device 102 (FIG. 1) to perform a role of, one or more operations of, and/or one or more functionalities of, the AP device including sub-10 Ghz AP 602 and mmWave AP 604; and/or controller 154 (FIG. 1) may be configured to control, trigger, and/or cause the non-AP device implemented by device 140 (FIG. 1) to perform a role of, one or more operations of, and/or one or more functionalities of, the non-AP device including sub-10 Ghz non-AP STA 612 and mmWave non-AP STA 614.

In some demonstrative aspects, as shown in FIG. 6, two STAs, e.g., the AP STA and the non-AP STA, that have a link established in a sub-7 GHz band may intend to establish a 60 GHz link as well.

In some demonstrative aspects, the AP STA and the non-AP STA may perform one or more operations of the phase 1, e.g., as described above with reference to FIG. 4.

In some demonstrative aspects, the AP STA and the non-AP STA may perform one or more repetitions of the phase 2 and/or the phase 3, e.g., as shown in FIG. 6, for example, in case the AP is reciprocal and the non-AP STA is non-reciprocal.

In some demonstrative aspects, in a first phase-2 620, both the transmit and receive settings of the AP may be obtained, as well as the receive settings of the client STA. For example, feedback of the obtained results may be sent during a first phase-3 622.

In some demonstrative aspects, the first phase-3 622 may also include a trigger discovery frame 624, which may be used to start a second phase-2 630.

In some demonstrative aspects, during the second phase-2 630, the transmit settings of the client STA may be obtained. For example, feedback of the transmit settings of the client STA may be sent to the AP, for example, during a second phase-3 632.

In some demonstrative aspects, one or more operations of the flow shown in FIG. 5 may be used in the procedure of FIG. 6, e.g., in case the AP is reciprocal and the non-AP STA is non-reciprocal. For example, these operations may allow the AP to further train its transmit and/or receive antenna settings.

Figure 7:
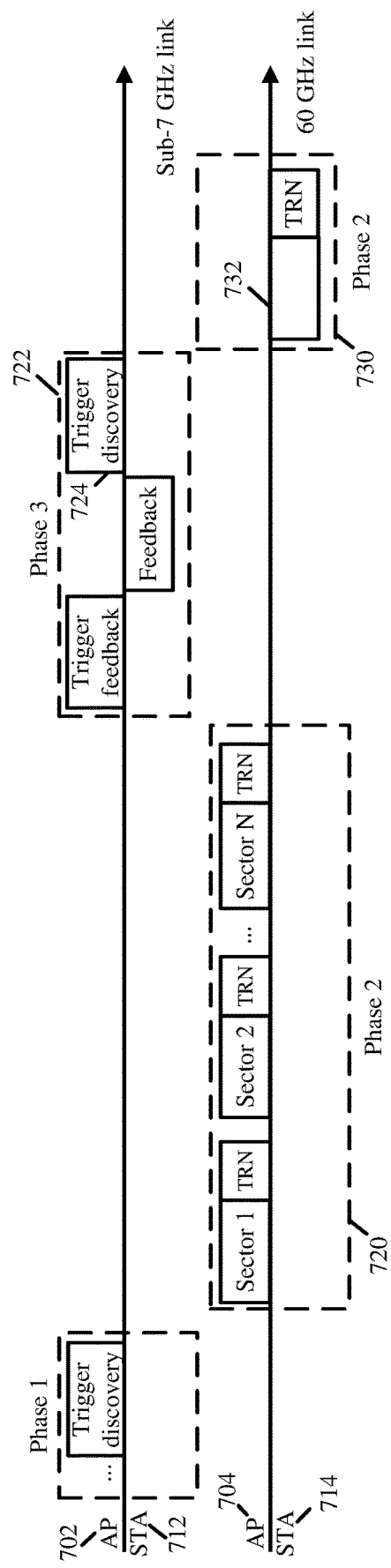
FIG. 7 is a schematic illustration of communications of a TXSS procedure over an mmWave wireless communication channel assisted by communications over a sub-10 GHz wireless communication channel, in accordance with some demonstrative aspects.

Reference is made to FIG. 7, which schematically illustrates communications of a TXSS procedure over an mmWave wireless communication channel assisted by communications over a sub-10 GHz wireless communication channel, in accordance with some demonstrative aspects.

In some demonstrative aspects, as shown in FIG. 7, one or more operations of the procedure of FIG. 7 may be performed by an AP device including a sub-10 Ghz AP 702 and an mmWave AP 704, and a non-AP device including a sub-10 Ghz non-AP STA 712 and an mmWave non-AP STA 714, e.g., as described below. For example, controller 124 (FIG. 1) may be configured to control, trigger, and/or cause the AP device implemented by device 102 (FIG. 1) to perform a role of, one or more operations of, and/or one or more functionalities of, the AP device including sub-10 Ghz AP 702 and mmWave AP 704; and/or controller 154 (FIG. 1) may be configured to control, trigger, and/or cause the non-AP device implemented by device 140 (FIG. 1) to perform a role of, one or more operations of, and/or one or more functionalities of, the non-AP device including sub-10 Ghz non-AP STA 712 and mmWave non-AP STA 714.

In some demonstrative aspects, as shown in FIG. 7, two STAs, e.g., the AP STA and the non-AP STA, that have a link established in a sub-7 GHz band may intend to establish a 60 GHz link as well.

In some demonstrative aspects, the AP STA and the non-AP STA may perform one or more operations of the phase 1, e.g., as described above with reference to FIG. 4.

In some demonstrative aspects, the AP STA and the non-AP STA may perform one or more repetitions of the phase 2 and/or the phase 3, e.g., as shown in FIG. 7, for example, in case the AP is non-reciprocal and the non-AP STA is reciprocal.

In some demonstrative aspects, in a first phase-2 720, both the transmit and receive settings of the client STA may be obtained, as well as the transmit settings of the AP. For example, feedback of the obtained results may be sent during a phase-3 722.

In some demonstrative aspects, the phase-3 722 may also include a trigger discovery frame 724, which may be used to start a second phase-2 730.

In some demonstrative aspects, during the second phase-2 730, the receive settings of the AP may be obtained.

In some demonstrative aspects, as shown in FIG. 7, the client STA may send a PPDU 732, e.g., only one PPDU, in the second phase-2 730. For example, antenna settings in this transmission of the PPDU 732 may be the antenna settings determined in the first phase-2 720.

In some demonstrative aspects, a TXSS procedure may be performed using packets including a TRN field, e.g., as described above with reference to FIG. 4.

In some demonstrative aspects, a TXSS procedure may be performed, e.g., even without relying on packets with a TRN field, e.g., as described below.

Figure 8:
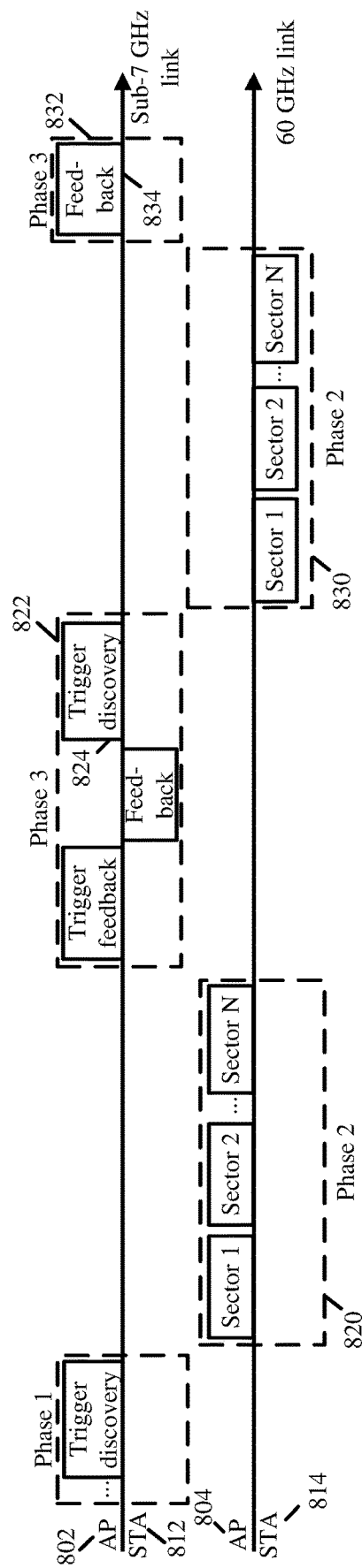
FIG. 8 is a schematic illustration of communications of a TXSS procedure over an mmWave wireless communication channel assisted by communications over a sub-10 GHz wireless communication channel, in accordance with some demonstrative aspects.

Reference is made to FIG. 8, which schematically illustrates communications of a TXSS procedure over an mmWave wireless communication channel assisted by communications over a sub-10 GHz wireless communication channel, in accordance with some demonstrative aspects.

In some demonstrative aspects, as shown in FIG. 8, one or more operations of the procedure of FIG. 8 may be performed by an AP device including a sub-10 Ghz AP 802 and an mmWave AP 804, and a non-AP device including a sub-10 Ghz non-AP STA 812 and an mmWave non-AP STA 814, e.g., as described below. For example, controller 124 (FIG. 1) may be configured to control, trigger, and/or cause the AP device implemented by device 102 (FIG. 1) to perform a role of, one or more operations of, and/or one or more functionalities of, the AP device including sub-10 Ghz AP 802 and mmWave AP 804; and/or controller 154 (FIG. 1) may be configured to control, trigger, and/or cause the non-AP device implemented by device 140 (FIG. 1) to perform a role of, one or more operations of, and/or one or more functionalities of, the non-AP device including sub-10 Ghz non-AP STA 812 and mmWave non-AP STA 814.

In some demonstrative aspects, as shown in FIG. 8, two STAs, e.g., the AP STA and the non-AP STA, that have a link established in a sub-7 GHz band may intend to establish a 60 GHz link as well.

In some demonstrative aspects, the AP STA and the non-AP STA may perform one or more operations of the phase 1, e.g., as described above with reference to FIG. 4.

In some demonstrative aspects, the AP STA and the non-AP STA may perform one or more repetitions of the phase 2 and/or the phase 3, e.g., as shown in FIG. 8, for example, in case the AP is reciprocal and the non-AP STA is reciprocal.

In some demonstrative aspects, as shown in FIG. 8, during a first phase-2 820, both the transmit and receive settings of the AP may be obtained. For example, feedback of the obtained results may be sent during a first phase-3 822.

In some demonstrative aspects, the first phase-3 822 may also include a trigger discovery frame 824, which may be used to start a second phase-2 830.

In some demonstrative aspects, during the second phase-2 830, the transmit and receive settings of the client STA may be obtained.

In some demonstrative aspects, as shown in FIG. 8, during a second phase-3 832, feedback of the transmit settings of the client STA may be fed back, e.g., in a feedback frame 834.

Figure 9:
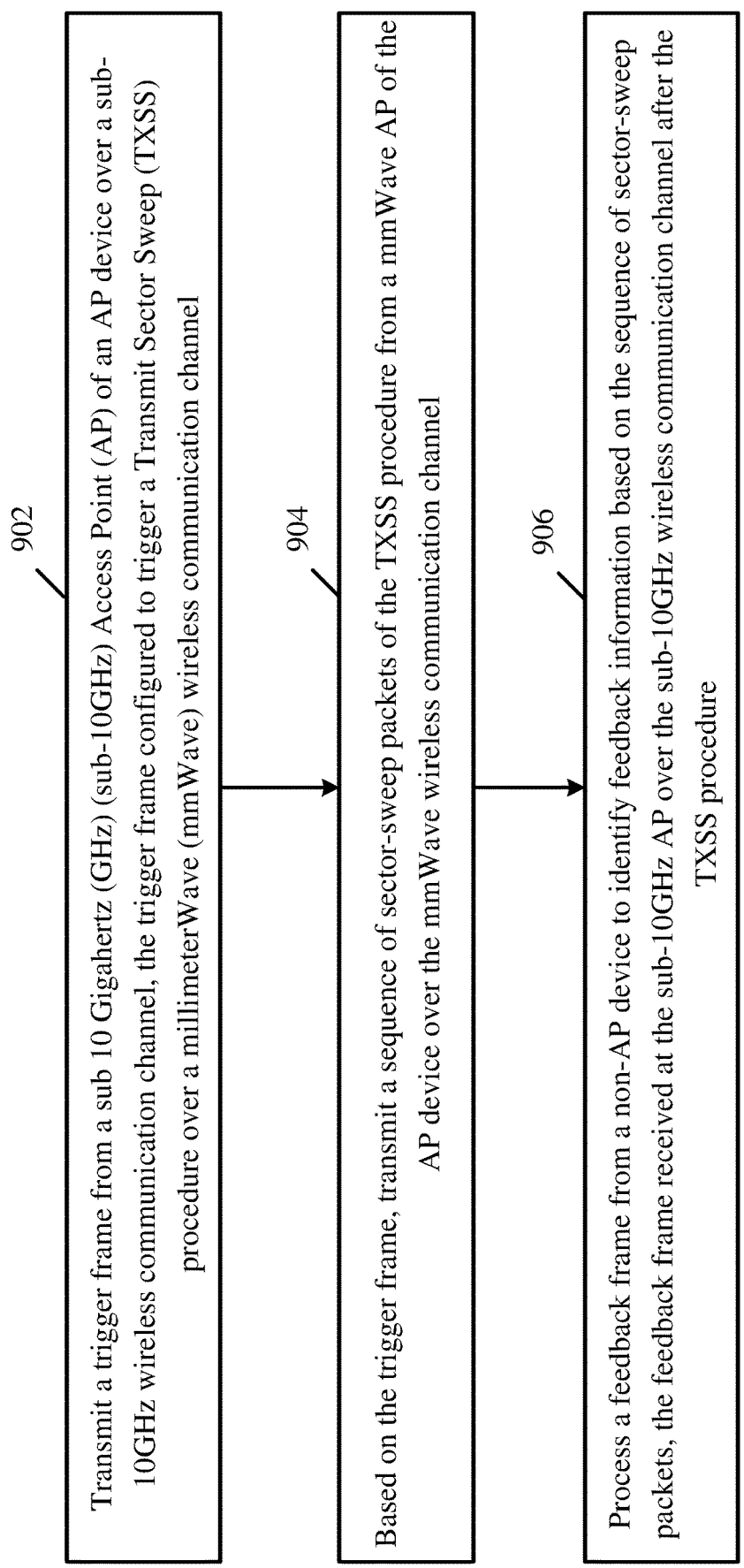
FIG. 9 is a schematic flow-chart illustration of a method of a TXSS procedure over an mmWave wireless communication channel, in accordance with some demonstrative aspects.

Reference is made to FIG. 9, which schematically illustrates a method of a TXSS procedure over an mmWave wireless communication channel, in accordance with some demonstrative aspects. For example, one or more of the operations of the method of FIG. 9 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 902, the method may include transmitting a trigger frame from a sub 10 Gigahertz (GHz) (sub-10 GHz) AP of an AP device over a sub-10 GHz wireless communication channel, the trigger frame configured to trigger a Transmit Sector Sweep (TXSS) procedure over a millimeterWave (mmWave) wireless communication channel. For example, controller 124 (FIG. 1) may be configured to cause, trigger, and/or control an AP of device 102 (FIG. 1) to transmit the trigger frame over the sub-10 GHz wireless communication channel, e.g., as described above.

As indicated at block 904, the method may include transmitting, based on the trigger frame, a sequence of sector sweep packets of the TXSS procedure from a mmWave AP of the AP device over the mmWave wireless communication channel. For example, controller 124 (FIG. 1) may be configured to cause, trigger, and/or control mmWave AP STA 141 (FIG. 1) to transmit the sequence of sector sweep packets of the TXSS procedure over the mmWave wireless communication channel, e.g., as described above.

As indicated at block 906, the method may include processing a feedback frame from a non-AP device to identify feedback information based on the sequence of sector sweep packets, the feedback frame received at the sub-10 GHz AP over the sub-10 GHz wireless communication channel after the TXSS procedure. For example, controller 124 (FIG. 1) may be configured to cause, trigger, and/or control device 102 (FIG. 1) to process the feedback frame from device 102 (FIG. 1), e.g., as described above.

Figure 10:
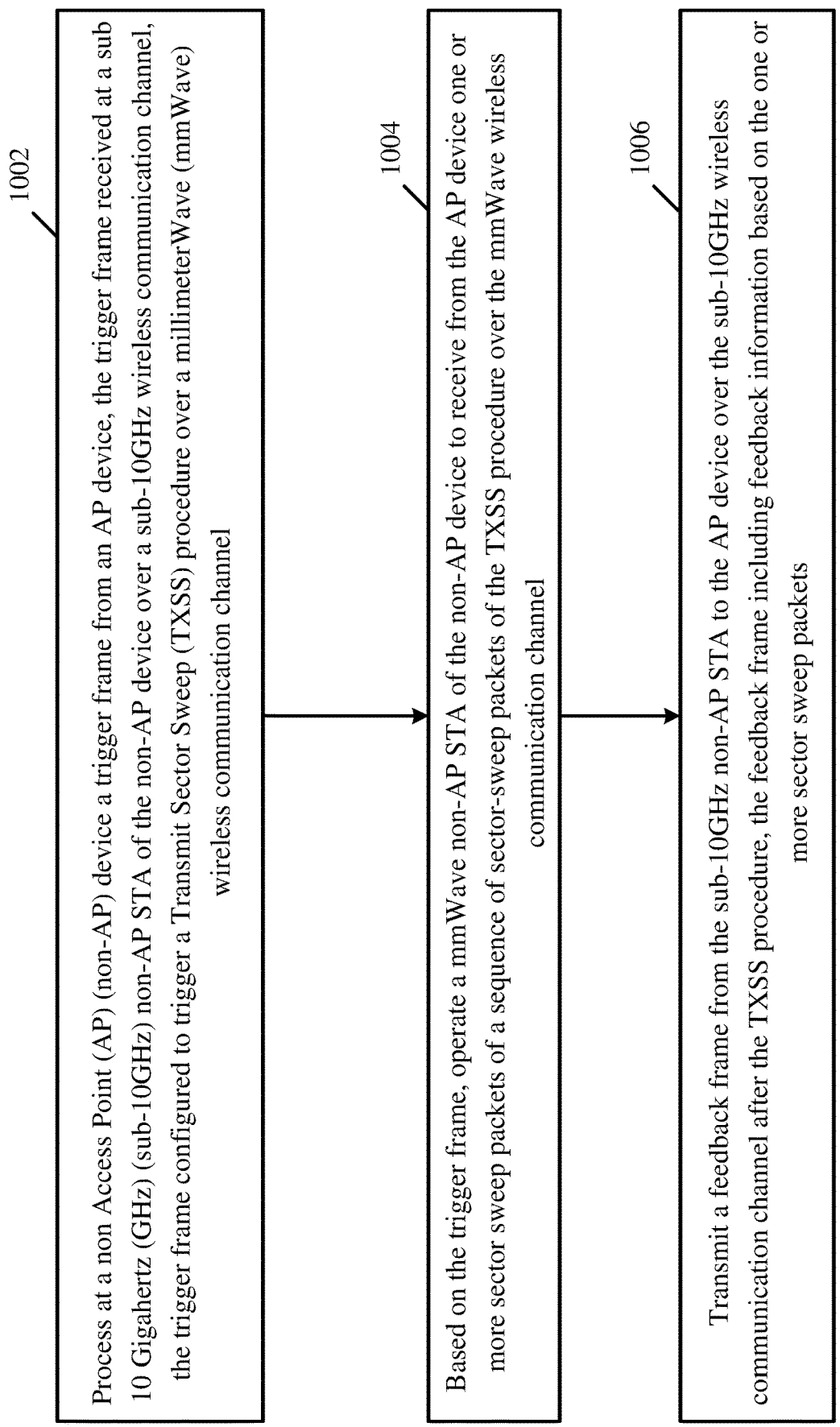
FIG. 10 is a schematic flow-chart illustration of a method of a TXSS procedure over an mmWave wireless communication channel, in accordance with some demonstrative aspects.

Reference is made to FIG. 10, which schematically illustrates a method of a TXSS procedure over an mmWave wireless communication channel, in accordance with some demonstrative aspects. For example, one or more of the operations of the method of FIG. 9 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1002, the method may include processing at a non-AP device a trigger frame from an AP device, the trigger frame received at a sub 10 Gigahertz (GHz) (sub-10 GHz) non-AP STA of the non-AP device over a sub-10 GHz wireless communication channel, the trigger frame configured to trigger a Transmit Sector Sweep (TXSS) procedure over a millimeterWave (mmWave) wireless communication channel. For example, controller 154 (FIG. 1)

may be configured to cause, trigger, and/or control device 140 (FIG. 1) to process the trigger frame received by a sub-10 GHz non-AP STA of device 140 (FIG. 1) from device 102 (FIG. 1), e.g., as described above.

As indicated at block 1004, the method may include operating a mmWave non-AP STA of the non-AP device, based on the trigger frame, to receive from the AP device one or more sector sweep packets of a sequence of sector sweep packets of the TXSS procedure over the mmWave wireless communication channel. For example, controller 154 (FIG. 1) may be configured to cause, trigger, and/or control mmWave STA 161 (FIG. 1) to receive one or more sector sweep packets of the sequence of sector sweep packets of the TXSS procedure over the mmWave wireless communication channel, e.g., as described above.

As indicated at block 1006, the method may include transmitting a feedback frame from the sub-10 GHz non-AP STA to the AP device over the sub-10 GHz wireless communication channel after the TXSS procedure, the feedback frame including feedback information based on the one or more sector sweep packets. For example, controller 154 (FIG. 1) may be configured to cause, trigger, and/or control the sub-10 GHz non-AP STA of device 140 (FIG. 1) to transmit the feedback frame to device 102 (FIG. 1), e.g., as described above.

Figure 11:
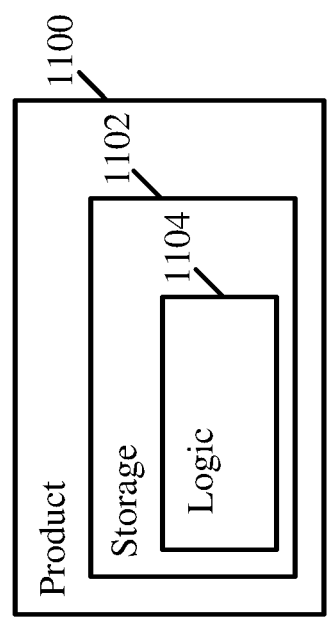
FIG. 11 is a schematic illustration of a product of manufacture, in accordance with some demonstrative aspects.

Reference is made to FIG. 11, which schematically illustrates a product of manufacture 1100, in accordance with some demonstrative aspects. Product 1100 may include one or more tangible computer-readable ("machine-readable") non-transitory storage media 1102, which may include computer-executable instructions, e.g., implemented by logic 1104, operable to, when executed by at least one computer processor, enable the at least one computer processor to implement one or more operations at device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities, and/or to perform, trigger and/or implement one or more operations and/or functionalities described with reference to the FIGS. 1, 2, 3, 4, 5, 6, 7, 8, 9 and/or 10, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1100 and/or machine readable storage media 1102 may include one or more types of computer-readable storage media capable of storing data, including volatile memory, non-volatile memory, removable or non-removable memory, erasable or non-erasable memory, writeable or re-writeable memory, and the like. For example, machine readable storage media 1102 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1104 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1104 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus, and optionally, comprising logic and circuitry configured to cause an Access Point (AP) device to transmit a trigger frame from a sub 10 Gigahertz (GHz) (sub-10 GHz) AP of the AP device over a sub-10 GHz wireless communication channel, the trigger frame configured to trigger a Transmit Sector Sweep (TXSS) procedure over a millimeterWave (mmWave) wireless communication channel; based on the trigger frame, transmit a sequence of sector sweep packets of the TXSS procedure from a mmWave AP of the AP device over the mmWave wireless communication channel; and process a feedback frame from a non-AP device to identify feedback information based on the sequence of sector sweep packets, the feedback frame received at the sub-10 GHz AP over the sub-10 GHz wireless communication channel after the TXSS procedure.

Example 2 includes the subject matter of Example 1, and optionally, wherein the apparatus is configured to cause the AP device to configure the sequence of sector sweep packets of the TXSS procedure based on one or more TXSS procedure parameters negotiated with the non-AP device over the sub-10 GHz wireless communication channel.

Example 3 includes the subject matter of Example 2, and optionally, wherein the one or more TXSS procedure parameters comprise at least one of a channel parameter to configure the mmWave wireless communication channel, a sector count of sectors of the mmWave AP, a Training (TRN) length of a TRN field to be included in the sector sweep packets, a TRN unit configuration parameter to indicate a TRN unit configuration of the TRN field, a sector sweep packet type of the sector sweep packets, or timing information to synchronize communications over the mmWave wireless communication channel.

Example 4 includes the subject matter of any one of Examples 1-3, and optionally, wherein the trigger frame comprises timing information to indicate a timing to initiate the TXSS procedure.

Example 5 includes the subject matter of any one of Examples 1-4, and optionally, wherein the trigger frame comprises a single-user trigger frame addressed to a single non-AP device, the single-user trigger frame configured to trigger the TXSS procedure for the single non-AP device.

Example 6 includes the subject matter of any one of Examples 1-4, and optionally, wherein the trigger frame comprises a multi-user trigger frame addressed to a plurality of non-AP devices, the multi-user trigger frame configured to trigger the TXSS procedure for the plurality of non-AP devices.

Example 7 includes the subject matter of Example 6, and optionally, wherein the multi-user trigger frame comprises multi-user timing information to indicate a timing to initiate the TXSS procedure at a same timing for two or more non-AP devices of the plurality of non-AP devices.

Example 8 includes the subject matter of Example 6 or 7, and optionally, wherein the multi-user trigger frame comprises user-specific timing information to indicate a first timing to initiate the TXSS procedure for a first non-AP device of the plurality of non-AP devices, and a second timing, different from the first timing, to initiate the TXSS procedure for a second non-AP device of the plurality of non-AP devices.

Example 9 includes the subject matter of any one of Examples 1-8, and optionally, wherein the apparatus is configured to cause the AP device to transmit a feedback trigger frame from the sub-10 Ghz AP to the non-AP device over the sub-10 GHz wireless communication channel after the TXSS procedure, the feedback trigger frame to trigger the non-AP device to transmit the feedback frame.

Example 10 includes the subject matter of any one of Examples 1-8, and optionally, wherein the feedback frame comprises an unsolicited frame, which is not triggered by the sub-10 GHz AP.

Example 11 includes the subject matter of any one of Examples 1-10, and optionally, wherein the feedback information corresponds to a best sector sweep packet received by the non-AP device during the TXSS procedure.

Example 12 includes the subject matter of any one of Examples 1-11, and optionally, wherein the apparatus is configured to cause the AP device to transmit an other trigger frame from the sub-10 GHz AP to the non-AP device over the sub-10 Ghz wireless communication channel after the feedback frame, wherein the other trigger frame is configured to trigger a Beamforming (BF) training procedure, and optionally, comprising one or more BF transmissions from the non-AP device to the mmWave AP over the mmWave wireless communication channel.

Example 13 includes the subject matter of any one of Examples 1-12, and optionally, wherein the apparatus is configured to cause the mmWave AP to reserve a wireless medium over the mmWave wireless communication channel for a duration of the TXSS procedure.

Example 14 includes the subject matter of any one of Examples 1-13, and optionally, wherein the AP device comprises an AP Multi-Link Device (MLD).

Example 15 includes the subject matter of any one of Examples 1-14, and optionally, wherein the sub-10 GHz wireless communication channel comprises a sub-7 GHz channel.

Example 16 includes the subject matter of any one of Examples 1-15, and optionally, wherein the mmWave wireless communication channel comprises a 60 GHz channel.

Example 17 includes the subject matter of any one of Examples 1-16, and optionally, comprising at least one radio to communicate the trigger frame and the feedback frame over the sub-10 GHz wireless communication channel, and to transmit the sequence of sector sweep packets over the mmWave wireless communication channel.

Example 18 includes the subject matter of Example 17, and optionally, comprising one or more antennas connected to the radio, and a processor to execute instructions of an operating system of the AP device.

Example 19 includes an apparatus, and optionally, comprising logic and circuitry configured to cause a non Access Point (AP) (non-AP) device to process a trigger frame from an AP device, the trigger frame received at a sub 10 Gigahertz (GHz) (sub-10 GHz) non-AP STA of the non-AP device over a sub-10 GHz wireless communication channel, the trigger frame configured to trigger a Transmit Sector Sweep (TXSS) procedure over a millimeterWave (mmWave) wireless communication channel; based on the trigger frame, operate a mmWave non-AP STA of the non-AP device to receive from the AP device one or more sector sweep packets of a sequence of sector sweep packets of the TXSS procedure over the mmWave wireless communication channel; and transmit a feedback frame from the sub-10 GHz non-AP STA to the AP device over the sub-10 GHz wireless communication channel after the TXSS procedure, the feedback frame, and optionally, comprising feedback information based on the one or more sector sweep packets.

Example 20 includes the subject matter of Example 19, and optionally, wherein the apparatus is configured to cause the non-AP device to operate the mmWave non-AP STA to receive the one or more sector sweep packets based on one or more TXSS procedure parameters negotiated with the AP device over the sub-10 GHz wireless communication channel.

Example 21 includes the subject matter of Example 20, and optionally, wherein the one or more TXSS procedure parameters comprise at least one of a channel parameter to configure the mmWave wireless communication channel, a sector count of sectors of the AP device, a Training (TRN) length of a TRN field to be included in the sector sweep packets, a TRN unit configuration parameter to indicate a TRN unit configuration of the TRN field, a sector sweep packet type of the sector sweep packets, or timing information to synchronize communications over the mmWave wireless communication channel.

Example 22 includes the subject matter of any one of Examples 19-21, and optionally, wherein the trigger frame comprises timing information to indicate a timing to initiate the TXSS procedure.

Example 23 includes the subject matter of any one of Examples 19-22, and optionally, wherein the trigger frame comprises a single-user trigger frame addressed to the sub-10 GHz non-AP STA.

Example 24 includes the subject matter of any one of Examples 19-22, and optionally, wherein the trigger frame comprises a multi-user trigger frame addressed to a plurality of non-AP devices.

Example 25 includes the subject matter of Example 24, and optionally, wherein the apparatus is configured to cause the non-AP device to identify in the trigger frame multi-user timing information to indicate a timing to initiate the TXSS procedure at a same timing for two or more non-AP devices.

Example 26 includes the subject matter of Example 24, and optionally, wherein the apparatus is configured to cause the non-AP device to identify in the trigger frame user-specific timing information to indicate a timing to initiate the TXSS procedure for the mmWave non-AP STA.

Example 27 includes the subject matter of any one of Examples 19-26, and optionally, wherein the apparatus is configured to cause the sub-10 GHz non-AP STA to transmit the feedback frame based on a feedback trigger frame received from the AP device over the sub-10 GHz wireless communication channel after the TXSS procedure.

Example 28 includes the subject matter of any one of Examples 19-26, and optionally, wherein the apparatus is configured to cause the sub-10 GHz non-AP STA to transmit the feedback frame as an unsolicited frame, which is not triggered by the AP device.

Example 29 includes the subject matter of any one of Examples 19-28, and optionally, wherein the feedback information corresponds to a best sector sweep packet received by the sub-10 GHz non-AP STA during the TXSS procedure.

Example 30 includes the subject matter of any one of Examples 19-29, and optionally, wherein the apparatus is configured to cause the non-AP device to process an other trigger frame received at the sub-10 GHz non-AP STA from the AP device over the sub-10 Ghz wireless communication channel after the feedback frame, and based on the other trigger frame transmit one or more Beamforming (BF) transmissions of a BF training procedure from the mmWave non-AP STA to the AP device over the mmWave wireless communication channel.

Example 31 includes the subject matter of any one of Examples 19-30, and optionally, wherein the non-AP device comprises a non-AP Multi-Link Device (MLD).

Example 32 includes the subject matter of any one of Examples 19-31, and optionally, wherein the sub-10 GHz wireless communication channel comprises a sub-7 GHz channel.

Example 33 includes the subject matter of any one of Examples 19-32, and optionally, wherein the mmWave wireless communication channel comprises a 60 GHz channel.

Example 34 includes the subject matter of any one of Examples 19-33, and optionally, comprising at least one radio to communicate the trigger frame and the feedback frame over the sub-10 GHz wireless communication channel, and to receive the one or more sector sweep packets over the mmWave wireless communication channel.

Example 35 includes the subject matter of Example 34, and optionally, comprising one or more antennas connected to the radio, and a processor to execute instructions of an operating system of the non-AP device.

Example 36 comprises an apparatus comprising means for executing any of the described operations of Examples 1-35.

Example 37 comprises a product comprising one or more tangible computer-readable non-transitory storage media comprising computer-executable instructions operable to, when executed by at least one processor, enable the at least one processor to cause a computing device to perform any of the described operations of Examples 1-35.

Example 38 comprises an apparatus comprising: a memory interface; and processing circuitry configured to: perform any of the described operations of Examples 1-35.

Example 39 comprises a method comprising any of the described operations of Examples 1-35.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause an Access Point (AP) device to:
   transmit a trigger frame from a sub 10 Gigahertz (GHz) (sub-10 GHz) AP of the AP device over a sub-10 GHz wireless communication channel, the trigger frame configured to trigger a Transmit Sector Sweep (TXSS) procedure over a millimeterWave (mmWave) wireless communication channel, wherein the trigger frame comprises timing information to indicate a timing to initiate the TXSS procedure over the mmWave wireless communication channel;
   based on the trigger frame, transmit a sequence of sector sweep packets of the TXSS procedure from a mmWave AP of the AP device over the mmWave wireless communication channel; and
   process a feedback frame from a non-AP device to identify feedback information based on the sequence of sector sweep packets, the feedback frame received at the sub-10 GHz AP over the sub-10 GHz wireless communication channel after the TXSS procedure.

2. The apparatus of claim 1 configured to cause the AP device to configure the sequence of sector sweep packets of the TXSS procedure based on one or more TXSS procedure parameters negotiated with the non-AP device over the sub-10 GHz wireless communication channel.

3. The apparatus of claim 2, wherein the one or more TXSS procedure parameters comprise at least one of a channel parameter to configure the mmWave wireless communication channel, a sector count of sectors of the mmWave AP, a Training (TRN) length of a TRN field to be included in the sector sweep packets, a TRN unit configuration parameter to indicate a TRN unit configuration of the TRN field, a sector sweep packet type of the sector sweep packets, or timing information to synchronize communications over the mmWave wireless communication channel.

4. The apparatus of claim 1, wherein the trigger frame comprises a single-user trigger frame addressed to a single non-AP device, the single-user trigger frame configured to trigger the TXSS procedure for the single non-AP device.

5. The apparatus of claim 1, wherein the trigger frame comprises a multi-user trigger frame addressed to a plurality of non-AP devices, the multi-user trigger frame configured to trigger the TXSS procedure for the plurality of non-AP devices.

6. The apparatus of claim 5, wherein the multi-user trigger frame comprises multi-user timing information to indicate a timing to initiate the TXSS procedure at a same timing for two or more non-AP devices of the plurality of non-AP devices.

7. The apparatus of claim 5, wherein the multi-user trigger frame comprises user-specific timing information to indicate a first timing to initiate the TXSS procedure for a first non-AP device of the plurality of non-AP devices, and a second timing, different from the first timing, to initiate the TXSS procedure for a second non-AP device of the plurality of non-AP devices.

8. The apparatus of claim 1 configured to cause the AP device to transmit a feedback trigger frame from the sub-10GHz AP to the non-AP device over the sub-10 GHz wireless communication channel after the TXSS procedure, the feedback trigger frame to trigger the non-AP device to transmit the feedback frame.

9. The apparatus of claim 1, wherein the feedback frame comprises an unsolicited frame, which is not triggered by the sub-10 GHz AP.

10. The apparatus of claim 1, wherein the feedback information corresponds to a best sector sweep packet received by the non-AP device during the TXSS procedure.

11. The apparatus of claim 1 configured to cause the AP device to transmit an other trigger frame from the sub-10GHz AP to the non-AP device over the sub-10GHz wireless communication channel after the feedback frame, wherein the other trigger frame is configured to trigger a Beamforming (BF) training procedure comprising one or more BF transmissions from the non-AP device to the mmWave AP over the mmWave wireless communication channel.

12. The apparatus of claim 1 configured to cause the mm Wave AP to reserve a wireless medium over the mmWave wireless communication channel for a duration of the TXSS procedure.

13. The apparatus of claim 1, wherein the AP device comprises an AP Multi-Link Device (MLD).

14. The apparatus of claim 1, wherein the sub-10 GHz wireless communication channel comprises a sub-7 GHz channel.

15. The apparatus of claim 1, wherein the mmWave wireless communication channel comprises a 60 GHz channel.

16. The apparatus of claim 1 comprising at least one radio to communicate the trigger frame and the feedback frame over the sub-10 GHz wireless communication channel, and to transmit the sequence of sector sweep packets over the mmWave wireless communication channel.

17. The apparatus of claim 16 comprising one or more antennas connected to the radio, and a processor to execute instructions of an operating system of the AP device.

18. A product comprising one or more tangible computer-readable non-transitory storage media comprising instructions operable to, when executed by at least one processor, enable the at least one processor to cause an Access Point (AP) device to:
transmit a trigger frame from a sub 10 Gigahertz (GHz) (sub-10 GHz) AP of the AP device over a sub-10 GHz wireless communication channel, the trigger frame configured to trigger a Transmit Sector Sweep (TXSS) procedure over a millimeterWave (mmWave) wireless communication channel, wherein the trigger frame comprises timing information to indicate a timing to initiate the TXSS procedure over the mmWave wireless communication channel;

based on the trigger frame, transmit a sequence of sector sweep packets of the TXSS procedure from a mmWave AP of the AP device over the mmWave wireless communication channel; and
process a feedback frame from a non-AP device to identify feedback information based on the sequence of sector sweep packets, the feedback frame received at the sub-10 GHz AP over the sub-10 GHz wireless communication channel after the TXSS procedure.

19. The product of claim 18, wherein the instructions, when executed, cause the AP device to configure the sequence of sector sweep packets of the TXSS procedure based on one or more TXSS procedure parameters negotiated with the non-AP device over the sub-10 GHz wireless communication channel.

20. An apparatus comprising logic and circuitry configured to cause a non Access Point (AP) (non-AP) device to:
process a trigger frame from an AP device, the trigger frame received at a sub 10 Gigahertz (GHz) (sub-10 GHz) non-AP STA of the non-AP device over a sub-10 GHz wireless communication channel, the trigger frame configured to trigger a Transmit Sector Sweep (TXSS) procedure over a millimeterWave (mmWave) wireless communication channel, wherein the trigger frame comprises timing information to indicate a timing to initiate the TXSS procedure over the mmWave wireless communication channel;
based on the trigger frame, operate a mmWave non-AP STA of the non-AP device to receive from the AP device one or more sector sweep packets of a sequence of sector sweep packets of the TXSS procedure over the mmWave wireless communication channel; and
transmit a feedback frame from the sub-10 GHz non-AP STA to the AP device over the sub-10 GHz wireless communication channel after the TXSS procedure, the feedback frame comprising feedback information based on the one or more sector sweep packets.

21. The apparatus of claim 20 configured to cause the non-AP device to operate the mmWave non-AP STA to receive the one or more sector sweep packets based on one or more TXSS procedure parameters negotiated with the AP device over the sub-10 GHz wireless communication channel.

22. The apparatus of claim 20, wherein the feedback frame comprises an unsolicited frame, which is not triggered by the AP device.

23. An apparatus comprising:
means for processing, at a non Access Point (AP) (non-AP) device, a trigger frame from an AP device, the trigger frame received at a sub 10 Gigahertz (GHz) (sub-10 GHz) non-AP STA of the non-AP device over a sub-10 GHz wireless communication channel, the trigger frame configured to trigger a Transmit Sector Sweep (TXSS) procedure over a millimeterWave (mm-Wave) wireless communication channel, wherein the trigger frame comprises timing information to indicate a timing to initiate the TXSS procedure over the mmWave wireless communication channel;
means for, based on the trigger frame, operating a mmWave non-AP STA of the non-AP device to receive from the AP device one or more sector sweep packets of a sequence of sector sweep packets of the TXSS procedure over the mmWave wireless communication channel; and
means for causing the non-AP device to transmit a feedback frame from the sub-10 GHz non-AP STA to the AP device over the sub-10 GHz wireless communication channel after the TXSS procedure, the feedback frame comprising feedback information based on the one or more sector sweep packets.

24. The apparatus of claim 23 comprising means for causing the non-AP device to operate the mmWave non-AP STA to receive the one or more sector sweep packets based on one or more TXSS procedure parameters negotiated with the AP device over the sub-10 GHz wireless communication channel.

* * * * *